(12) United States Patent
Strauss et al.

(10) Patent No.: US 9,391,774 B1
(45) Date of Patent: Jul. 12, 2016

(54) STRAUSS GREENMAIL SYSTEM AND METHOD

(71) Applicants: Ronald I. Strauss, Summerland Key, FL (US); Kris Ball, Keywest, FL (US)

(72) Inventors: Ronald I. Strauss, Summerland Key, FL (US); Kris Ball, Keywest, FL (US)

(73) Assignee: STRAUSSKEY PARTNERS, LLC, Miami, FL (US)

( * ) Notice: Subject to any disclaimer, the term of this patent is extended or adjusted under 35 U.S.C. 154(b) by 0 days.

(21) Appl. No.: 14/633,435

(22) Filed: Feb. 27, 2015

Related U.S. Application Data

(60) Provisional application No. 61/945,308, filed on Feb. 27, 2014.

(51) Int. Cl.
*H04L 9/08* (2006.01)
*H04L 9/32* (2006.01)
*H04L 29/06* (2006.01)

(52) U.S. Cl.
CPC .............. *H04L 9/32* (2013.01); *H04L 9/3239* (2013.01); *H04L 63/0428* (2013.01)

(58) Field of Classification Search
CPC ... G06F 3/04883; G06F 17/214; G06K 9/222; G06K 9/00154; G06K 9/00409; G06K 9/033; G06K 9/6814; G06T 11/203
See application file for complete search history.

(56) References Cited

U.S. PATENT DOCUMENTS

| | | | |
|---|---|---|---|
| 5,327,342 A * | 7/1994 | Roy | G06F 17/211 345/467 |
| 5,805,810 A | 9/1998 | Maxwell | |
| 6,408,091 B1 * | 6/2002 | Sakaguchi | G06F 3/04883 382/187 |
| 6,732,152 B2 | 5/2004 | Lockhart et al. | |
| 6,856,860 B2 | 2/2005 | Stringham et al. | |
| 7,191,146 B2 | 3/2007 | Wulff et al. | |
| 7,352,899 B2 | 4/2008 | Loeb | |
| 7,966,492 B1 * | 6/2011 | Gasparini | G06F 21/31 713/151 |
| 7,991,706 B2 | 8/2011 | Mattern | |
| 8,386,571 B2 | 2/2013 | Belew et al. | |
| 2001/0026262 A1 | 10/2001 | Van Gestel et al. | |

(Continued)

OTHER PUBLICATIONS

Using a one way hash for Password encryption (Beginning Java forum at JavaRa.pdf, Kiernan et al. Aug. 25, 2008.*

*Primary Examiner* — Tae Kim
*Assistant Examiner* — Shu Chun Gao
(74) *Attorney, Agent, or Firm* — Malloy & Malloy, P.L.

(57) ABSTRACT

The invention is directed to a system to authenticate an electronic message to a recipient in a sender's handwriting. The system has a server including a processor and a software application configured to execute instructions related to: identifying the electronic message composed by the sender, converting the electronic message composed by the sender into the sender's handwriting, where the sender's handwriting is in an electronic format; the electronic format defining a sender's electronic handwriting message, formatting the sender's electronic handwriting message to correspond to the formatting of the electronic message composed by the sender, encrypting the sender's electronic handwriting message to restrict readability of contents, and transmitting the sender's electronic handwriting message to the recipient. The invention is also directed to a method to authenticate the electronic message to the recipient in the sender's handwriting and a method to decipher the sender's electronic message delivered to the recipient.

13 Claims, 12 Drawing Sheets

(56) References Cited

U.S. PATENT DOCUMENTS

| | | | |
|---|---|---|---|
| 2001/0048436 A1* | 12/2001 | Sanger | G06F 17/214 345/467 |
| 2006/0078203 A1* | 4/2006 | Loeb | G06F 17/214 382/187 |
| 2006/0149823 A1* | 7/2006 | Owen | G06Q 10/107 709/206 |
| 2008/0098085 A1* | 4/2008 | Krane | G06F 17/30896 709/217 |
| 2011/0157615 A1* | 6/2011 | Rimai | G06F 17/214 358/1.11 |
| 2014/0007246 A1* | 1/2014 | Nelson | H04L 63/12 726/26 |
| 2014/0164974 A1* | 6/2014 | Kim | G06F 3/04883 715/773 |
| 2015/0103383 A1* | 4/2015 | Dowling | H04N 1/00244 358/402 |

* cited by examiner

STRAUSS GREENMAIL SYSTEM AND METHOD

CLAIM OF PRIORITY

The present application is based on and a claim of priority is made under 35 U.S.C. Section 119(e) to a provisional patent application that is currently in the U.S. Patent and Trademark Office, namely, that having Ser. No. 61/945,308 and a filing date of Feb. 27, 2014, and which is incorporated herein by reference.

BACKGROUND OF THE INVENTION

1. Field of the Invention

This invention generally relates to systems and methods of computer generated encrypted writing. More specifically, to generate and transmit electronic messages in sender's handwriting containing encryption(s), which allows only an intended recipient of the electronic message to access its contents.

2. Description of Related Art

Ever since human writing was arguably invented in ancient Mesopotamia at around 4000 BC, it has been through several technological upheavals. The tools, styles and mediums used for writing have constantly evolved—from Sumerian tablets, Egyptian hieroglyphs and first codex to printing, pens and personal electronic devices. As such, writing is a complex task that requires intricate skills. It incorporates a complex neural pathway that dynamically integrates perception, motion, and cognition. Given this, each and every one of us humans have a unique way we write. Naturally, some people write in fonts that are larger than others, some write in doodles that only a few can comprehend, while some others carefully cross their t's and dot their i's opting for artistic opulence. Regardless of the diversity in writing, however, when you truly acquaint yourself with an individual's handwriting, you recognize whose script it is, just as if it were a well-known painting or photograph. In fact, experts in human handwriting suggest that hand writing can unequivocally portray both the psychological and the physiological state of an individual. Consequently, some scientific studies of human handwriting indicate that a great deal of information can be gathered into the physical, mental and emotional state of the writer. So then clearly, handwriting may be more important skill set than once thought of, perhaps even helping professionals dig deeper into decoding human characteristics.

With that being said, communication skills, including writing, are one of the most important skill sets that a person can possess. Take traditional correspondence in corporate world for instance. In modern corporate world, business professionals are required to write countless electronic mails or "emails" as they are abbreviated, on a daily basis. Given this, email correspondences from business professionals have to be succinct and self-explanatory in order for businesses to be productive. As such, effectively composed emails prevent unwarranted delays in transactions and processes, improving the overall economic structure of a corporation or business.

Moreover, business professionals and other individuals who have a frantic and demanding lifestyle prefer to communicate quickly via emails, saving many time and money. Accordingly, the advent of email messaging has revolutionized the modern world immensely. Emails have become the popular means of written communication for business and personal communications. Emails are fast, convenient and can be virtually delivered to anyone around the world, readily eliminating spatial postal barriers. As such, businesses are no longer at the mercy of the post office and can reach their important goals by moving tons of information within the virtual communication highway. Additionally, many individuals also use other means of electronic communication besides emails primarily for non-business purposes, namely, texting, instant messaging and social media sites. Most of these electronic means of communication including email mandate the sender type or dictate to compose the message in a predictable font that is commonly available.

Accordingly, emails and other forms of electronic messaging tend to discourage the development of rich, extended communication to its intended recipient. The artificial fonts they are composed in can be a supernumerary, when compared to the finesse arrangement of alphabets illustrated in handwritten communication. As such, handwritten communication can be comforting to the recipient. It subtly engages people on an emotional level, reinforcing a personalized connection between the sender and the recipient that typed messages do not. Additionally, it exemplifies that the writer has gone further by adding a personal touch, resulting in the message being a unique identification. Simply put, hand written messages pledge an ideology that the writer has sincerely taken the time, effort and thoughtfulness to compose its contents. Similarly, on a business platform, when it comes to capturing clients, prospects, or team members, handwritten correspondence tends to illuminate the contents of the message to a higher level. It implies to the recipient that the sender of the correspondence is sincerely attempting to gain and sustain a meaningful relationship between them. As a result, it makes them feel they are special and important, and not just another business client. However, most commonly used avenues of electronic messaging preclude the sender from using their own handwriting in their electronic messages.

Electronic messaging has also been highly compromised, when it comes to privacy. As a result, there has been an increased public interest concerning privacy and security of electronic messaging. Additionally, simplicity in electronic messaging interfaces and platforms has invited unwarranted eavesdropping. For example, many electronic messaging tools claim to protect the contents of the message, but generally fail to incorporate critical features that involve encryption or secure deletion. In other words, majority of the electronic messaging data is not encrypted while in transit between the sender and the recipient. Consequently, while the convenience of electronic message is increasing, privacy and security of the electronic messages is immensely jeopardized. For instance, it is undeniable that the quantity and sophistication of intrusive cyberattacks on electronic message systems is epidemically increasing. So while security of electronic messages remains a concern, increasing trend of intrusion attacks from the prying eyes of some hackers and online email service vendors is undoubtedly causing the existing cyber security systems to lose pace. Furthermore, as cyberattacks on email systems increase and evolve, the victims of electronic messages continue to be vulnerable and concerned. Suspicious hacking activities involving electronic messages tends to compromise classified information between individuals and businesses. For instance, with every intrusive activity in electronic messaging, businesses lose valuable time, costing them millions of dollars to restore and protect their valuable information, not to mention the embarrassment and the negative media attention that inevitably follows. Additionally, due to the dynamic nature of intrusive attacks, wherein the hackers are constantly improvising their cyberattacks, individuals and businesses are left without any peace of mind. For instance, most intrusion detection systems like anti-virus, malware, spyware, amongst others seem to only protect electronic messaging as long as the latest, up to date versions are downloaded. In fact, most of these so called detection and protection systems require constant attention—they need to be updated frequently, costing people hundreds of thousands of dollars over their lifetime, and more often than not, most people forget to update them all together.

Clearly, there is a need in the market that can allow a sender to compose, store, encrypt, and virtually send an electronic message to a recipient in a sender's electronic handwriting. As such, there is a need that the sender's electronic handwriting or sender's electronic handwriting message can only be read by its intended recipient(s). Furthermore, there is a need in the market that can allow the sender's electronic handwriting to serve as an encrypted, time-sensitive method of authentication, ensuring privacy and security of the electronic message. Even further, there is a need in the market that allows the sender's electronic handwriting message to self-destruct after a predetermined amount of time, and better yet, destruct, if any other method, other than the one in which the recipient decrypts to authenticate the message is initiated. As such a system and method that can allow the aforementioned combined with the ability to store and retrieve the sender's electronic handwriting easily on an electronic device is desperately needed.

SUMMARY OF THE INVENTION

The invention is intended to present a solution to these and other needs which remain in the relevant field of art. As such, and for purposes of clarity in describing the structural and operative features in at least one preferred embodiment, the present invention is directed first to a system to authenticate an electronic message to a recipient in a sender's handwriting. Accordingly, in one of the preferred embodiments, the system has a server including a processor. The processor is configured to help the server execute a plurality of software programs including application programs necessary to operate on at least one electronic device connected to the server via a network. Accordingly, in one of the preferred embodiments, the server can comprise a large mainframe, a mini-computer cluster, or a group of servers functioning as one unit. As such, the server is configured to share data, information and/or store a plurality of software application data and resources, including but not limited to software application(s) related to the system and method(s) of the present invention. Moreover, the server is configured to provide content, web-based applications, user interfaces ("UIs"), web pages, process data, and/or facilitate. Given all this, in one of the preferred embodiments, the server can be accessed through the network. More specifically, the network can comprise one or plurality of communication networks that can be linked and communicate with each other, including a combination of local area network (LAN) and wide area network (WAN). Additionally, the network may also comprise wired and wireless communication systems, including but not limited to cell phone networks, Wi-Fi local networks and terrestrial microwave networks. Consequently, the network can be implemented using a plurality of protocols, including but not limited to Attached Resource Computer Network (ARCNET), Multiprotocol label switching (MPLS), Asynchronous Transfer Mode (ATM), Bluetooth, Transmission Control Protocol/Internet Protocol (TCP/IP), DECnet, Ethernet, User Datagram Protocol (UDP), Fiber Distributed Data Interface (FDDI), Hypertext Transport Protocol (HTTP), Frame relay, Simple Mail Transfer Protocol (SMTP), FireWire, File transfer Protocol (FTP), Internet Protocol Suite (IPS), Internetwork Packet Exchange (IPX) and Universal Serial Bus (USB).

Furthermore, the server may have a mixture of analog and digital interfaces. It can support a plurality of users, including processing their unique identifications. Given this, the server is configured to provide a unique identification to each user, when the user accesses the software application stored on the server. As such, in one of the preferred embodiments, a user may comprise various types of users, including at least one user or an electronic message sender or simply a sender who composes, converts, encrypts and transmits an electronic message via any web-based electronic mailing service. Similarly, the user may also comprise at least one recipient user or electronic message recipient user or simply a recipient who receives and decrypts the electronic message transmitted by the sender via any web-based electronic mailing service. Examples of web-based electronic mailing service include HOTMAIL, GMAIL, WEBMAIL, AOL, or MSN. Accordingly, the electronic message of the sender, before it is converted into the sender's electronic handwriting, can be composed in various ways including typing, dictating, texting, scanning, writing on an interactive screen of a tablet, or any other preferred ways to compose the electronic message on the user interface of an electronic device. Additionally, while, for convenience, some of the preferred embodiments of the present invention have herein been described in context of the user interface of any web based email service, embodiments of the present invention are equally applicable to various other electronic commerce architectures, mobile commerce architectures, social media commerce architectures, and other structures outside of web based email service.

Furthermore, in accordance to one of the preferred embodiments, the system comprises a software application. The software application can be stored on the server. As such, the server can be on a local network or remote cloud-based network. Accordingly, accessing the software application in one of the preferred embodiments can be accomplished over the network. Given this, the electronic device, the server and the database can all access the network, sufficient to enable a seamless, virtual communication to transfer and share data between them. Alternatively, in other preferred embodiments, the software application can be located locally on at least one electronic device or a local server. In this embodiment, however, it would not be necessary for the user to access the software application stored on the server via the network. Also, in one of the preferred embodiments, information related to the user's electronic handwriting may also be stored and located locally on the hard drive or external drive of at least one electronic device of the user. Accordingly, the electronic device may typically include, but is not limited to computers, laptops, mobile phones, televisions, tablets, game consoles, personal digital assistants, watches, wireless devices, network PC's, programmable consumer electronics, Internet appliances, or any other devices that can provide user access to operating systems, browsers, user interfaces and/or a combination thereof. As such, in one of the preferred embodiments, the electronic device is connected to the network, wherein the electronic device has a user interface for the sender and the recipient to communicate via electronic messaging. As such, the electronic messaging may be conducted on various types of commercially available electronic messaging services, devices and platforms. Given all this, the software application of the present invention can be provided as a self-hosted perpetual model with service support. Under this model, the user would purchase the software application to be installed locally on the electronic device. Alternatively, however, the software application of present invention can be provided over the network via the remote server, to be accessed from anywhere around the world. As such, the software application accessed over the network may be updated automatically without any required interference from the user (sender or recipient with the software application). Additionally, the software application may also employ different programming languages, or combinations thereof, to perform some of the methods of the present invention, including but not limited to AWK, Pearl, Python, JAVA, HTML, TXL, XSLT, C, C++, and C#.

Given all this, in one of the preferred embodiments, the software application comprises a graphic user interface ("GUI"). The GUI is configured to provide the user with interfaces that guide the user through the identification, conversion, formatting, encryption and decryption methods, which will be subsequently described in greater detail. As such, the GUI of the software application is configured to display at least one electronic handwriting of the sender on one of its interfaces. Accordingly, one of the interfaces of the GUI of the software application is configured to display a variety of sender's electronic handwritings ranging from middle school, high school, college, first job, and/or the present, provided that the characters/character sets of such handwriting(s) have been prior processed and uploaded for selection purposes. Given this, in one of the preferred embodiments, the GUI of the software application can display to the sender various options of the sender's electronic handwriting to select from. Having a plurality of electronic handwritings also contributes towards the software application generating a plurality of encryption codes. This is because in one of the preferred embodiments, the sender's electronic handwriting itself can be used for encryption purposes. As such, more electronic handwritings of the sender could mean more options to encrypt from.

Furthermore, in one of the preferred embodiments, the system of the present invention also comprises a database. The database is configured to store information related to the sender's handwriting, wherein the database is in a communicating relation with the server. In other words, the server and the database are configured to communicate with each other over the network. As such, this communication between the server and database over the network is sufficient for the sender to retrieve total or partial information related to the sender's electronic handwriting stored on the database. Furthermore, this allows the server including the processor to quickly process the sender's electronic handwriting information so that it can be seamlessly displayed on the GUI of the software application. Accordingly, in one of preferred embodiments, the database may comprise of a plurality of electronic files that are designed and modeled to support the system and methods of the present invention. Given this, the database can be used as a storage of all information related to the user's electronic handwriting. Additionally, the hard drive, other external drive of the electronic device of the sender and/or a database on the local network can also be operable to store all information, including the electronic files pertaining to the sender's electronic handwriting.

Furthermore, in one of the preferred embodiments, the server including the processor and the software application are configured to execute instructions related to: identifying the electronic message composed by the sender, converting the electronic message to emulate the sender's electronic handwriting message, formatting the sender's electronic handwriting message to correspond to the formatting of the electronic message composed by the sender, encrypting the sender's electronic handwriting message to prohibit readability of content, and transmitting the sender's electronic handwriting message to the recipient.

More specifically, in one of the preferred embodiments, the server including the processor and the software application are configured to execute instructions related to identifying the electronic message composed by the sender. The identifying the electronic message composed by the sender further comprises the sender composing the electronic message on the user interface of the sender's web based email service. Accordingly, in one of the preferred embodiments, upon composing the electronic message on the user interface of the web based email service, the sender can use an embedded widget of the software application provided on the user interface of the web based email service to initiate the GUI of the software application. Accordingly, activating the embedded widget can initiate the GUI of the software application. Once initiated, the sender will be directed to the GUI of the software application, where a display interface prompting the sender to "log in" into the sender's account will be displayed. Upon logging in, the GUI of the software application will display for the sender at least one electronic handwriting option to be selected from. Again, the options on this display will depend on the different types of handwriting styles the sender may have saved. Accordingly, the GUI of the software application allows the sender to select from at least one of sender's electronic handwritings. Upon selecting the preferred electronic handwriting, the server will communicate with the database over the network, where the sender's electronic handwriting is stored. The server including the processor will then retrieve the sender's selected electronic handwriting from the database. Accordingly, the server is configured to retrieve the sender's electronic handwriting from the database. As such, once retrieved, the software application converts the electronic message of the sender to emulate the sender's selected electronic handwriting. Accordingly, the software application is configured to convert the electronic message composed by the sender to correspond to the sender's electronic handwriting. More specifically, the software application is designed to identify the composed (typed or dictated for instance) electronic message of the sender (user), and consequently, convert the composed electronic message to resemble the sender's handwriting in an electronic format. As such, the software application is configured to emulate the sender's handwriting in an electronic format.

Looking further in one of the preferred embodiments, the server including the processor and the software application are configured to execute instructions related to converting the electronic message composed by the sender or any other composer into a sender's handwriting. The sender's handwriting is in an electronic format. As such, the sender's handwriting in the electronic format defines a sender's electronic handwriting message. More specifically, the software application is configured to replace each character set of each word of the electronic message composed by the sender to correspond to each character set of each word in the sender's handwriting found in the database.

Furthermore, looking into one of the preferred embodiments, the server including the processor and the software application are configured to execute instructions related to formatting the sender's electronic handwriting message to correspond to the formatting of the electronic message composed by the sender. More specifically, the software application is configured to format the sender's electronic handwriting message to correspond to the formatting of the sender's electronic message. For instance, after converting the sender's electronic message into the sender's electronic handwriting, the formatting of the latter may not match aesthetically in terms of size, height or width of the characters. As such, the software application is operable to format the converted sender's electronic handwriting, so as to enable the sender's electronic handwriting to compliment within the existing user interface of the online electronic mail service. As such, the software application is configured to allow the sender's electronic handwriting to correspond to the formatting of the sender's initially composed electronic message. Alternatively, in other embodiments, the user may also be able to manually format the sender's electronic handwriting to correspond to the electronic message composed by the sender once the sender's electronic message is transferred on to the user interface of the electronic mail service.

Furthermore, in one of the other preferred embodiments, the sender can "copy" the initially composed electronic message from the user interface of the web based email service and "paste" the copied message directly onto GUI of the software. As such, the software is operable to directly accept copied composed electronic messages within its GUI. Accordingly, in one of the preferred embodiments, once the sender has logged into the sender's individual account on the software application, the GUI will display at least one of sender's electronic handwritings that has been previously processed and uploaded. Given this, methods related to conversion and formatting of the sender's composed electronic message transferred into the software application will take place, once the appropriate selection of the sender's electronic handwriting has been made by the sender. These and others will be subsequently described in detail.

Next, in one of the preferred embodiments, the server including the processor and the software application are configured to execute instructions related to encrypting the sender's electronic handwriting message to prohibit readability of content. Accordingly, the software application configured to generate at least one hash code to be embedded in the sender's electronic handwriting. More specifically, the software application generates the hash code and preferably inserts it along the bottom edge of the formatted sender's electronic handwriting. Additionally, in one of the preferred embodiments, the software application is configured to generate at least one hash code to be embedded in the sender's electronic handwriting. Even further, in some preferred embodiment, the software application is also configured to locate and identify the hash code embedded in the sender's electronic handwriting. However, the hash code may not visible to the naked eye, and as such, will not be expressly displayed anywhere in the encrypted message or on the GUI of the software application, despite its incognito ubiquitous presence. For example, the hash code may implicitly represent as a "stamp" of sorts that allows the sender's electronic handwriting to serve as an encryption. Alternatively, in other embodiments, the hash code may be positioned at different locations within the formatted sender's electronic handwriting message. As such, also in other embodiments, the hash code may be visible to the naked eye. So then given all this, once the hash code is generated and embedded, the software application locates and identifies the hash code embedded in the sender's electronic handwriting message. In other words, the remote recipient of the sender's electronic handwriting can use the software application to successfully locate and identify the embedded hash code. In addition, the recipient can also use the software application to decipher/encode the encryption in the sender's electronic handwriting message, sufficient to be able to comprehend its contents.

Given all this, in one of the preferred embodiments, at least one hash code is configured to provide at least one encryption algorithm. As such, the encryption algorithm may comprise, but is not limited to a proprietary score, a known code and a visual identifier. More specifically, the proprietary score is based on the handwriting style of the user. The proprietary score is applied against two-dimensional (flattened) samples of the user's handwriting in an electronic format. As such, for purposes of simplicity the proprietary score can also be referred to as an "A" code. Accordingly, the user's electronic handwriting itself serves as an encryption algorithm. More specifically, the A code can be generated using a score system based on the user's handwriting. Consequently A code can also be used to unlock or decrypt an existing encrypted electronic message based on the score system. More particularly, in one of the preferred embodiments, the A code is generated by using the score system by creating a score using the user's unique handwriting. In other words, the software application is configured to create an initial score, which is an arbitrary score based on each user's unique handwriting style. So merely as an example, User X may have a score of 50 based on the User X's unique handwriting, while User Y may have a score of 80 based on the User Y's handwriting. Accordingly, the scoring system keeps tally of the score over time, when the user inputs all the necessary character sets of the user's handwriting into the software application. In other words, the score of the user's handwriting will change based on the completeness of all the character sets entered by the user. As such, once all the character sets of the user's handwriting are entered by the user and recorded by the software application, the scoring system can create the A code based on the score of that particular user. Again, this score is arbitrary numbered, but is accurately assessed based on the user's unique handwriting. Therefore, in one of the preferred embodiments, once the comprehensive character list is recorded, the A code will be generated by the software application based on the user's score.

Furthermore, in one of the preferred embodiments, the A code also allows the user to unlock or decrypt the user's electronic handwriting message in its encrypted form. More specifically, as the user enters his own handwriting electronically in the software application, the software will analyze the user's handwriting in the electronic format. If the user's handwriting matches the score for the user's electronic handwriting message, the A code is decrypted. Furthermore, because the A code can be replicated by the user at any remote location given the fact that the user has immediate access to the user's own handwriting, in one of the preferred embodiments, no network to connect the user to the server or database to retrieve the A code is required. More specifically, in one of the preferred embodiments, in which the software application is locally located on the electronic device, the user may not be required to connect to the server over the network in order to retrieve any of the sender's electronic handwriting from the database. In other words, once the sender has "downloaded" the sender's electronic handwriting message locally to the electronic device in its encrypted form, there is no requirement to upload it again in order to decrypt it. The user can simply use the user's own handwriting in electronic format and match the score allocated to the user's electronic handwriting message encrypted with the A code. Naturally, since the user's handwriting is identical to the electronic handwriting message encrypted with the A code, the message will be successfully decrypted. Consequently, to achieve the writing by the user in this preferred embodiment, the user may use a stylus pen or the user's fingers to write on a user interactive screen of the electronic device. In other words, the electronic device may have a "touch screen" that allows the user to write in the user's own handwriting using the GUI of the software application.

Next, in one of the other preferred embodiments, the known code may serve as a public key certificate. As such, for purposes of simplicity the known code can also be referred to as a "B" code. The B code is configured to assist the remote recipient in decrypting the sender's electronic handwriting message, once it is received by the recipient. Given this, the B code may be only used for to encrypt the sender's electronic handwriting message when a viable network exists. More particularly, the B code can be generally used to encrypt the sender's electronic handwriting when the message is transmitted across the network to the recipient. Furthermore, the B code, although similar to the public key certificate, can be as arbitrary as a number, a code, an image, or a formula. Accordingly, the B code is randomly generated by the software application to be distributed to the recipient. As such, the recipient can effectively decrypt the sender's electronic handwriting message by entering the identical number, code, image, or formula to match the encrypted certificate of the B code.

Even further, in one of the preferred embodiments, the visual identifier is embedded on a certain point with the script of each character or word in the sender's electronic message. As such, for purposes of simplicity the visual identifier can also be referred to as a "C" code. The C code may function as a checksum or validator to ensure that the sender's electronic message is genuine and has not been decoded before. Additionally, the C code is able to diagonally "stamp" the sender's electronic message and may include, but is not limited to a date code, a watermark, or a combination thereof. The C code allows the sender to enhance the authenticity of the sender's electronic handwriting message, when it is remotely decoded by the recipient. As such, the C code is generated as a unique checksum for each and every electronic message based on the number of letters, space, words, and characters there are in the sender's handwriting. So for instance, in one of the preferred embodiments, codes are strategically embedded between words and letters at certain X and Y coordinates on the two dimensional plane of the sender's electronic handwriting message. More specifically, the codes are embedded at certain coordinates between certain words or characters of the sender's electronic handwriting message. Accordingly, during the process of decoding by the recipient on the remote end, the C codes are stripped from the originally encrypted format and computed for validation. As such, in one of the preferred embodiments, the computation of the codes can be based on the sum of the coordinates the codes are positioned within the electronic sender's message. For instance and merely as an example, if the sender's electronic handwriting message is represented as a two-dimensional plane, and if the C code X is placed on coordinates (1,2) and (4,1) of the two dimensional electronic handwriting message plane, the sum of these X and Y coordinates would result in (A+B)=(5,3). Accordingly, in this example, the C code would be encrypted as the sum (5,3). As such, when the recipient receives the message and commences decryption, any other sum besides (5,3) at which the C code is identified, can conclude that the message is not authentic. Alternatively, in this preferred embodiment, once the electronic message is received and the recipient commences decryption, if the C code results to the sum (5,3) as illustrated in the example above, it may signify that the sender's electronic message is genuine, and therefore further validated.

Additionally, in other preferred embodiments, the C code can be used as an additional buffer and encrypted in combination with A and B codes. Therefore, in this preferred embodiment, the sender may transmit the electronic handwriting message to the recipient that has been encrypted by a combination of codes, namely, A code and C code and/or B code and C code. In addition, a combination of codes can also be typically generated for encryption in situations where privacy and security of the electronic message is paramount and the information contained in the message is highly classified.

Moreover, in one of the preferred embodiments, the server including the processor and the software application are configured to execute instructions related to transmitting the sender's electronic handwriting message to the recipient. More specifically, the software application is configured to prompt to the sender to transfer the sender's electronic handwriting message back to the user interface of the electronic mail service. As such, this is one of the preferred embodiments in which the sender's electronic handwriting message can be transmitted to its intended recipient(s) via electronic mail. Accordingly, the transfer of the sender's electronic handwriting message can be automated by activating an embedded widget of the web mail service provider on the GUI of the software application. This allows the software application to directly transfer the sender's electronic handwriting message back into the sender's web mail service user interface. More specifically, the software application can be configured to communicate with the sender's web mail service. However, in order to accomplish this, the sender may be required to first log into the sender's user account on the web mail service to further this automatic transfer of the sender's electronic handwriting message into the user interface of the sender's account on the web mail service. Alternatively, in other preferred embodiments, once the sender's electronic handwriting message is ready to be transmitted, the sender may execute a "copy" and "paste" function within the GUI of the software application. This can be executed by electronically copying the sender's electronic handwriting message from the GUI of the software application and electronically pasting it into the user interface of the sender's account on the web mail service. As such, in other preferred embodiments, the software application may comprise of at least one embedded widget of a third party electronic mail service carrier embedded within the GUI of the software application. Given this, the electronic mail service carrier can be HOTMAIL, GMAIL, WEBMAIL, OUTLOOK, AOL, MSN, and the like. So then, once the sender's electronic handwriting message is pasted on to the user interface of the sender's web mail service, the sender inputs the intended recipient's email address within the user interface of the web mail service. Then, the transmission of the sender's electronic handwriting message is executed when the sender hits the "send" button within the user interface of the sender's account on the web mail service.

Conversely, an embedded widget of the software application can also be embedded within the user interface(s) of the third party electronic mail service carriers/providers. For example, the embedded widget may be embedded and displayed on the user interface of the web mail service such that when the sender activates the widget embedded therein, the software initiates its GUI prompting the sender to convert the composed electronic message into the sender's electronic handwriting. As such, in this preferred embodiment, it may necessitate for the user to have already logged into the software application, allowing the software application to remain in active mode. Accordingly, this enables the sender to activate the GUI of the software application immediately to transfer the composed electronic message for converting it into the sender's electronic handwriting and/or encrypting the sender's electronic handwriting.

Now, looking further into some of the preferred embodiments of the method to authenticate an electronic message composed by a sender to a recipient in a sender's handwriting includes accessing an interface on at least one electronic device to compose the electronic message to the recipient. More specifically and merely as an example, the sender accesses the user interface of the electronic device by accessing the email server over the internet. Next, the user logs into the account to compose an electronic email. This means that the user can use various methods including but not limited to typing or dictating to compose the electronic message. However, the user interface is not just limited to logging to a virtual email service account. As such, the sender may compose the electronic message on various other commerce architectures that allow the sender to compose a message on the user interface. The sender may then access the software application by initiating a separate GUI of the software application. More specifically, the sender may activate the GUI of the software application by "double clicking" on a separate icon on the interface of the electronic device. Alternatively, however, in one of the other preferred embodiments, the sender may activate the GUI of the software application by "clicking" on the embedded widget of the software application as an option within the user interface of the virtual email service account. As such, by either of two methods, the sender accomplishes to access the GUI of the software application so that the composed message can be converted. More particularly, in one of the preferred embodiments, once the sender has clicked on the software application icon or embedded widget, the software allows the sender to negotiate through an initial "log in" interface of the GUI of the software application. This comprises the sender inputting a username and password specifically associated with the sender's account within the software application. As such, the logging into the software application allows the software application to validate the sender, thus enabling the sender to access the following interface of the GUI of the software application. Moreover, this may allow the software to unequivocally identify the sender, generating all the relevant information pertaining to the sender's electronic handwriting. Alternatively, in other preferred embodiments, the sender may not require the logging in process. More specifically, if the software application is stored locally on the sender's electronic device, i.e., the software application is not stored on the server over the network, the software application can direct the sender without the log in interface of the GUI of the software application, onto the next interface of the GUI of the software application.

Looking further in one of the preferred embodiments, the method to authenticate an electronic message composed by the sender to the recipient in the sender's handwriting further includes converting the electronic message composed by the sender or any other composer into the sender's handwriting. As such, the sender's handwriting is in an electronic format. The electronic format defines a sender's electronic handwriting message. More specifically, the method to authenticate the electronic message composed by the sender to the recipient in the sender's handwriting includes the method of using the software application to replace each character set of each word of the electronic message composed by the sender to correspond to each character set of each word in the sender's handwriting is found in the database. Again, the sender's handwriting found in the database in an electronic format ("sender's electronic handwriting"). Accordingly, the sender "copies" and "pastes" the sender's composed electronic message into the GUI of the software application. As such, sender then selects from a variety of sender's handwriting(s) that is yielded by the GUI of the software application to be converted. More particularly, once the sender logs in or activates into the sender's account via the GUI of the software application, the server including the processor retrieves the sender's handwriting information from the database over the network. As such, in order to retrieve the sender's handwriting, the server is configured to communicate with the database over the network. Alternatively, however, in some other preferred embodiments, the sender's handwriting information is located locally on the electronic device and does not require the server to communicate with the database over the network. Additionally, in one of the preferred embodiments, the selection of the sender's handwriting directly corresponds to the sender's handwriting located on the database and/or on the electronic device. In other words, the sender may be able to access the sender's electronic handwriting provided that a comprehensive list of sender's handwriting characters/character sets have already been electronically processed and uploaded by the server.

Accordingly, in one of the preferred embodiments, the sender is able to access and select the sender's electronic handwriting, primarily by uploading the sender's actual handwritten into the electronic format. For instance, in one of the preferred embodiments, using an electronic interactive pen ("stylus pen") on an interactive electronic screen ("touch screen") of an electronic device ("tablet computer"), the sender electronically composes a message by incorporating all the characters sets of the sender's actual handwriting. By doing this, the server is able to process the character sets of the sender's handwriting. This is done by identifying and then uploading all each and every character and character set of the sender's handwriting to be stored on the database under the sender's account. Given this, once the electronic message containing a comprehensive list of all of sender's handwriting characters or character sets is communicated to the server, it identifies the characters, consequently uploading them in the electronic format to be stored on the database over the network. As such, the comprehensive sample size of characters once uploaded, allows the sender to successfully convert all of the sender's consequently composed messages into sender's electronic handwriting. Accordingly, using the software application, the server replaces each character set of each word of the electronic message composed by the sender to accurately correspond to each character set of each word in the sender's electronic handwriting found in the database. For instance, if the electronically composed message of the sender contains the word "system", this word including its characters/alphabets will be replaced to correspond to the word "system" in the sender's electronic handwriting (cursive or otherwise depending on the sender's actual handwriting style). Consequently, by replacing each character/word to correspond to the character/word of sender's handwriting, it is ensured that the entire electronically composed message is converted accurately into the sender's electronic handwriting.

Alternatively, in one of the preferred embodiments, the sender may also electronically scan the sender's actual handwriting that was once recorded in the past. For example, in one of the preferred embodiments, the sender may scan the sender's handwriting from sender's high school years by scanning the document on which it was once written. The server then identifies this writing, including all its incorporated individual characters in the electronic format, processing it to be stored electronically on the database over the network. Given this, in one of the preferred embodiments, the GUI of the software application permits the sender to store each of the sender's handwriting, i.e., high school handwriting or present handwriting for example, on to the database under an appropriate title in the sender's account. In other preferred embodiments, however, the sender may not be required to access the sender's electronic handwriting stored in the database. This is because the sender, in real time, may instantly write on the interactive interface of the electronic device using the interactive tool. Alternatively, the sender can scan the sender's handwriting from a physical medium such as a paper document to be electronically uploaded for conversion. As such, in this embodiment, the server processes the sender's electronic handwriting, without having it to store on the database. This means that the sender has direct access to the handwriting selection interface of the GUI of the software application to instantly convert the pending composed electronic message into the sender's electronic handwriting. As this can be done in real time as one continuous process, in this preferred embodiment, the necessity to have the database store the sender's electronic handwriting over the network can be entirely or partially avoided. Similarly, the need to have a network all together can be entirely or partially avoided, if the server including the processor and the software application are located locally on the electronic device.

Furthermore, in one of the other preferred embodiments, the method to authenticate the electronic message to the recipient in the sender's electronic handwriting includes encrypting the sender's electronic handwriting to restrict readability of message contents. Accordingly, the sender may be prompted or notified by the GUI of the software application to encrypt the sender's electronic handwriting before transmission. Alternatively, in other preferred embodiments, the software application may be operable to automatically encrypt the sender's electronic handwriting message, before it is transmitted to the intended recipient(s). Furthermore, the GUI of the software application may also be configured to display a selection of encryption codes for the sender. This means that in some preferred embodiments, the sender may be given a choice to select from a plurality of codes depending on various factors, including but not limited to the intent of the message, the level of security preferred or the type of mail service. As a result, the software application is configured to encrypt the sender's electronic handwriting message to ensure that no third party, other than the intended recipient, is able to the message contents. Accordingly, in one of the preferred embodiments, the software application is configured to generate the hash code. The hash code is preferably inserted along the bottom edge of the formatted sender's electronic handwriting. More specifically, in one of the preferred embodiments, the software application is configured to generate at least one hash code to be embedded in the sender's electronic handwriting. As such, the hash code is invisible to the naked eye, avoiding any express display within the encrypted message or anywhere on the GUI of the software application. Additionally, the hash code may implicitly represent as a "stamp" of sorts that allows the sender's electronic handwriting to serve as an encryption. Alternatively, in other embodiments, the hash code may be positioned at different locations within the formatted sender's electronic handwriting and may be visible to the naked eye. Given all this, in one of the preferred embodiments, at least one hash code is configured to provide at least one encryption algorithm. As such, the encryption algorithm may comprise, but is not limited to a proprietary score, a known code and a visual identifier. As such, each of the encryption algorithms has already been explained in greater detail.

Furthermore, in one of the preferred embodiments, the method to authenticate an electronic message composed by a sender to a recipient in a sender's handwriting further includes transmitting the sender's electronic handwriting message to the recipient. More specifically, the software application is configured to prompt to the sender to transfer the sender's electronic handwriting message back to the user interface of the electronic mail service. As such, this is one of the preferred embodiments in which the sender's electronic handwriting message can be transmitted to its intended recipient(s) via electronic mail. Accordingly, the transfer of the sender's electronic handwriting message can be automated by activating an embedded widget of the web mail service provider on the GUI of the software application. This allows the software application to directly transfer the sender's electronic handwriting message back into the sender's web mail service user interface. More specifically, the software application can be configured to communicate with the sender's web mail service. However, in order to accomplish this, the sender may be required to first log into the sender's user account on the web mail service to further this automatic transfer of the sender's electronic handwriting message into the user interface of the sender's account on the web mail service. Alternatively, in other preferred embodiments, once the sender's electronic handwriting message is ready to be transmitted, the sender may execute a "copy" and "paste" function within the GUI of the software application. This can be executed by electronically copying the sender's electronic handwriting message from the GUI of the software application and electronically pasting it into the user interface of the sender's account on the web mail service. As such, in other preferred embodiments, the software application may comprise at least one embedded widget of a third party electronic mail service carrier embedded within the GUI of the software application. Given this, the electronic mail service carrier can be HOTMAIL, GMAIL, WEBMAIL, OUTLOOK, AOL, MSN, and the like. So then, once the sender's electronic handwriting message is pasted on to the user interface of the sender's web mail service, the sender inputs the intended recipient's email address within the user interface of the web mail service. Then, the transmission of the sender's electronic handwriting message is executed when the sender hits the "send" button within the user interface of the sender's account on the web mail service.

Conversely, an embedded widget of the software application can also be embedded within the user interface(s) of the third party electronic mail service carriers/providers. For example, the embedded widget may be embedded and displayed on the user interface of the web mail service such that when the sender activates the widget embedded therein, the software initiates its GUI prompting the sender to convert the composed electronic message into the sender's electronic handwriting. As such, in this preferred embodiment, it may necessitate the user to have already logged into the software application, allowing the software application to remain in active mode. Accordingly, this enables the sender to activate the GUI of the software application immediately to transfer the composed electronic message for converting it into the sender's electronic handwriting and/or encrypting the sender's electronic handwriting.

Furthermore, in one of the preferred embodiments, the method to decipher a sender's electronic handwriting message to a recipient includes receiving the sender's electronic handwriting message on at least one electronic device with a user interface. More specifically, the method to decipher an electronic message delivered to a recipient in a sender's electronic handwriting includes displaying the contents of the sender's electronic handwriting message to be viewed by the recipient on the interface of the at least one electronic device. Accordingly, once the converted and encrypted sender's electronic handwriting message is transmitted electronically, the recipient is able to receive and display the message preferably on the recipient's electronic mail account via the user interface of a web based electronic mail service. Alternatively, in other preferred embodiments, the electronic message can be sent and received on many other commercially viable electronic message platforms, services and devices including hand held devices, mobile phones, mini-computers, and the like. So then given all this, once the sender's electronic handwriting message has been received and identified, the recipient may initiate the decryption of the sender's electronic handwriting by "clicking" on the icon located on the electronic device. Alternately, the recipient can also access the software application on the server by logging onto the recipient's account over the network. Again, as disclosed, the server may be remotely located and accessed via the network, or alternatively can be located locally. Consequently, the software application as described in earlier embodiments, can also be accessed via the network or alternatively, can be located on the electronic device. Given this, in one of the preferred embodiments, the recipient is directed to the GUI of the software application, which comprises a display that allows the recipient to log into the recipient account. Accordingly, the recipient can then "copy" and "paste" the sender's electronic message onto the GUI of the software application in order to commence the decryption of the sender's electronic handwriting message. This is because, when initially received, the recipient (or anyone for that matter) is not able to access the contents of the sender's electronic handwriting message. Given this, the recipient utilizes the software application to decrypt the encrypted sender's electronic handwriting message. Again, the encrypted sender's electronic handwriting message contains embedded hash code that only the software application can identify and decrypt. This is because the encryption code including its location within the sender's electronic handwriting message cannot be identified by the naked eye.

Accordingly, in one of the preferred embodiments, the method to decipher an electronic message delivered to a recipient in the sender's electronic handwriting includes the identifying a hash code within the sender's electronic handwriting message. However, as aforementioned in earlier embodiments, none of the hash codes are visible to the naked eye, and as such, will not be expressly displayed, despite its ubiquitous presence. Accordingly, each of the hash codes implicitly represent a stamp that encrypts the sender's electronic handwriting message preventing prying eyes from viewing it. Additionally, the hash codes may be positioned at different locations within the formatted sender's electronic handwriting. Given all this, in one of the preferred embodiments, the software application identifies the hash code by scanning the sender's electronic handwriting. Scanning through the entire message enables the software to provide a comprehensive search that may be necessary to locate all the embedded hash codes. As such, the software scans the sender's electronic handwriting message configuring the precise location of all of the embedded hash codes therein. This is because, in alternate preferred embodiments, it is possible that the sender may have embedded multiple hash codes within the sender's electronic handwriting message. Additionally, the hash codes may be located within various coordinates of the sender's electronic handwriting message. Consequently, the software application searches the entire message, ensuring that all the hash codes are accurately located.

Looking further, in one of the preferred embodiments, method to decipher a sender's electronic handwriting message delivered to a recipient comprises decrypting the hash code embedded within the sender's electronic handwriting message. More specifically, once the software application searches, identifies and locates the hash code(s) embedded within the sender's electronic handwriting message, the software application commences the decryption process. Accordingly, the decryption process depends on the type of hash code that the sender has used to encrypt the message. In other words, decrypting the hash code within the sender's electronic handwriting further comprises ascertaining the type of the encryption algorithm embedded within the sender's electronic handwriting. More specifically, the hash code is configured to provide at least one encryption algorithm. As such, the encryption algorithm comprises, but is not limited to a proprietary score (A Code), a known code (B Code) and a visual identifier (C Code). Given all this, the software application determines the precise type of encryption algorithm (A Code, B Code or C Code) embedded within the sender's electronic handwriting message. As such, determining the type of encryption algorithm may enable the software application to consequently ascertain the precise decryption method that the software application may be required to utilize. Accordingly, in some embodiments, the decryption method used by the software application may be relative to the type of algorithm embedded in the sender's electronic handwriting message. For example, if the software application ascertains the encryption algorithm to be A code, appropriate decryption method may be initiated. So then, if the embedded algorithm is A code, which is typically the private key, typically used by the sender/user/composer of the electronic message to decrypt their own electronic message rather than distributed publicly for the recipient to decipher the message, the software application will look for an identical handwriting of the sender stored in the database. This is because the A code is used to unlock or decrypt an existing encrypted electronic message based on the score system. More particularly, in one of the preferred embodiments, the A code is generated by using the score system by creating a score using the user's unique handwriting. As the user enters his own handwriting in the software application, the software analyzes the user's handwriting. Accordingly, if the user's handwriting matches the score for the user's electronic handwriting based on the score system, the A code is decrypted. Therefore, in this preferred embodiment, the user uses the private key (user's own handwriting) to decrypt the user's electronic message.

Furthermore, because the A code can be replicated by the user at any remote location given the fact that the user has immediate access to the user's own handwriting, in one of the preferred embodiments, no network to connect the user to the server or database to retrieve the A code is required. More specifically, in one of the preferred embodiments, in which the software application is locally located on the electronic device, the user may not be required to connect to the server over the network in order to retrieve any of the sender's electronic handwriting from the database. In other words, once the user has "downloaded" the attachment or user's own electronic handwriting message locally to the electronic device in its encrypted A Code format, there is no requirement to upload it again in order to decrypt it. This is because the user can simply use the user's own handwriting in an electronic format to match the score allocated to the user's electronic handwriting message. Therefore, to decrypt without remote server access on the network, the user may simply use the interactive tool (stylus pen) or the user's own fingers on the interactive interface ("touch screen") of the electronic device ("tablet"). In other words, the touch screen of the electronic device allows the user to electronically write in the user's own handwriting. As such, the software application on the electronic device automatically recognizes the written message on the touch screen interface. This can be done by the software application, once the software application is already active/open on the electronic device. Given this, the software application will allow the user to either upload this electronically written message on the touch screen to determine if an exact match is accomplished or alternatively in another preferred embodiment, it may have a separate electronic handwriting interface on its GUI that allows the user to write electronically within the GUI of the software application using the touch screen of the electronic device to determine if an exact match is determined. Therefore, in one of the preferred embodiments, where the user's message is encrypted with an A code, the user's handwriting itself will be sufficient to ascertain whether or not the downloaded electronic message can be decrypted. Accordingly, if the score is identical, the electronic message will be instantly decrypted allowing the user to view its contents. Furthermore, in some other preferred embodiments, the A code can also be used as the public key, in which the recipient decrypts the sender's message rather than the private key embodiment aforementioned. And so, in this preferred embodiment, the recipient may be able to decipher the user/sender's message that has been encrypted using the A code. To accomplish this, the recipient would require a prior sender/user's electronic handwriting stored on the recipient's database. Accordingly, when the recipient receives the new, encrypted sender's electronic message, the software application will compare the sender's electronic handwriting stored on the recipient's database with the newly received encrypted sender's electronic message. As such, if the software application determines that the two have an identical score based on the scoring system, the sender's message may be decrypted.

Next, if the software application ascertains the encryption algorithm to be B code, appropriate decryption method may be initiated. As such, in one of the other preferred embodiments, the B code serves as a public key certificate. This typically means that the B code is configured to assist the remote recipient in decrypting the sender's electronic handwriting message, once it is received by the recipient. Furthermore, the B code, although similar to the public key certificate, can be arbitrary as a number, a code, an image, or a formula. Accordingly, in one of the preferred embodiments, the B code is randomly generated by the software application. This code is consequently shared only with the recipient by the sender. As such, the recipient can only decrypt the sender's electronic handwriting message by entering the identical number, code, image, or formula provided by the sender to the recipient in efforts to match the encrypted certificate of the B code. Accordingly, in other preferred embodiments, multiple certificates including a combination of numbers, codes, formulas can be generated as a B Code. As such, the B Code can also be customized by the sender. For example, the B code can be manually assigned by the sender to encrypt the sender's electronic handwriting message by replicating an answer to commonly asked questions such as, "What city were you born?" As such, the GUI of the software application can prompt the recipient with the question as part of decrypting the sender's electronic handwriting message. Consequently, in this preferred embodiment, the GUI of the software application may also provide an interface for the recipient to enter the B Code provided by the sender to answer the aforementioned question.

Furthermore, if the software application ascertains the encryption algorithm to be C code, appropriate decryption method may be initiated. The C code may function as a checksum or validator to ensure that the sender's electronic message is genuine and has not been decoded before. Additionally, the C code is able to diagonally "stamp" the sender's electronic message and may include, but is not limited to a date code, a watermark, or a combination thereof. Additionally, the C code allows the sender to enhance the authenticity of the sender's electronic message, when it is remotely decoded by the recipient. As such, the C code is generated as a unique checksum for each and every electronic message based on the number of letters, space, words, and characters there are in the sender's handwriting. So for instance, in one of the preferred embodiments, C code(s) can be strategically embedded between words and letters at certain X and Y coordinates on the two dimensional plane of the sender's electronic handwriting message. Given this, if the sender's electronic handwriting message is represented as a two-dimensional plane, and if the C code is placed on coordinates (1,2) and (4,1) of the two dimensional electronic handwriting message plane, the sum of these X and Y coordinates would be $(A+B)=(5,3)$. Accordingly, the C code is preferably encrypted as the sum (5,3). As such, when the recipient receives the message and commences decryption, any other sum besides (5,3) at which the C code is encrypted, can signify to the recipient that the message is not authentic. Alternatively, in this preferred embodiment, once the sender's electronic handwriting message is received and the recipient commences decryption, if the C code exacts to the sum (5,3) as illustrated in the example above, it can signify that the sender's electronic message is genuine, and therefore validated. So therefore, in one of the preferred embodiments, when the software application on the recipient's end commences the decryption process, it is configured to recognize that the sum of the C code should be identical based on the sum encrypted by the C code of the software application on the sender's end. As such, the software application is configured to recognize various such systems of mathematical operations. Therefore, in other preferred embodiments, the C code may be generated automatically by using different variations including but not limited to subtraction, multiplication, division, standard deviation, median, mean, and other complex mathematical integrals.

Furthermore, in one of the preferred embodiments, the method to decipher a sender's electronic handwriting message delivered to a recipient includes destroying the sender's electronic handwriting message after a predetermined amount of time. More specifically, once the software application decrypts the message, so as to make it readable to the user/recipient, the composer/sender of the message can assign a self-destructing timer to the electronic handwriting message. Accordingly, once the sender's electronic handwriting message is decrypted, a specified time limit based on the sender's election assigned to the electronic handwriting message, determines when the electronic handwriting message will deleted. So for instance, the software application can be configured to assign a time limit on the sender's electronic handwriting message, after which the electronic handwriting message will be electronically "shredded." This means that the electronic message will be destroyed such that it would be improbable for anyone to retrieve it again. Accordingly, in one of the preferred embodiments, the sender may assign a time limit, which would immediately take effect after the user/recipient has successfully decrypted the electronic handwriting message. As a result, the software application may be configured to program/code the time limit within the sender's electronic message, thus enabling it to self-destruct after the specified time is used up.

Furthermore, in other preferred embodiments, the sender's electronic handwriting message may also self-destruct, if methods other than the decryption of the codes are utilized. More specifically, the sender's electronic handwriting message is configured to destruct, if induced by any other method, other than decrypting the encryption algorithm within the sender's electronic handwriting using the key system. So for example, if anyone including the recipient uses any other methods including but not limited to capturing screen shots, saving on the electronic device, uploading it to a cloud based server, and/or copying and printing the sender's electronic message are utilized, the sender's electronic handwriting message will destruct or electronically shred itself perpetually, so as to render it impossible for anyone to retrieve it again.

These and other objects, features and advantages of the present invention will become clearer when the drawings as well as the detailed description are taken into consideration.

BRIEF DESCRIPTION OF THE DRAWINGS

For a fuller understanding of the nature of the present invention, reference should be had to the following detailed description taken in connection with the accompanying drawings in which.

Like reference numerals refer to like parts throughout the several views of the drawings.

DETAILED DESCRIPTION OF THE PREFERRED EMBODIMENT

Figure 1:
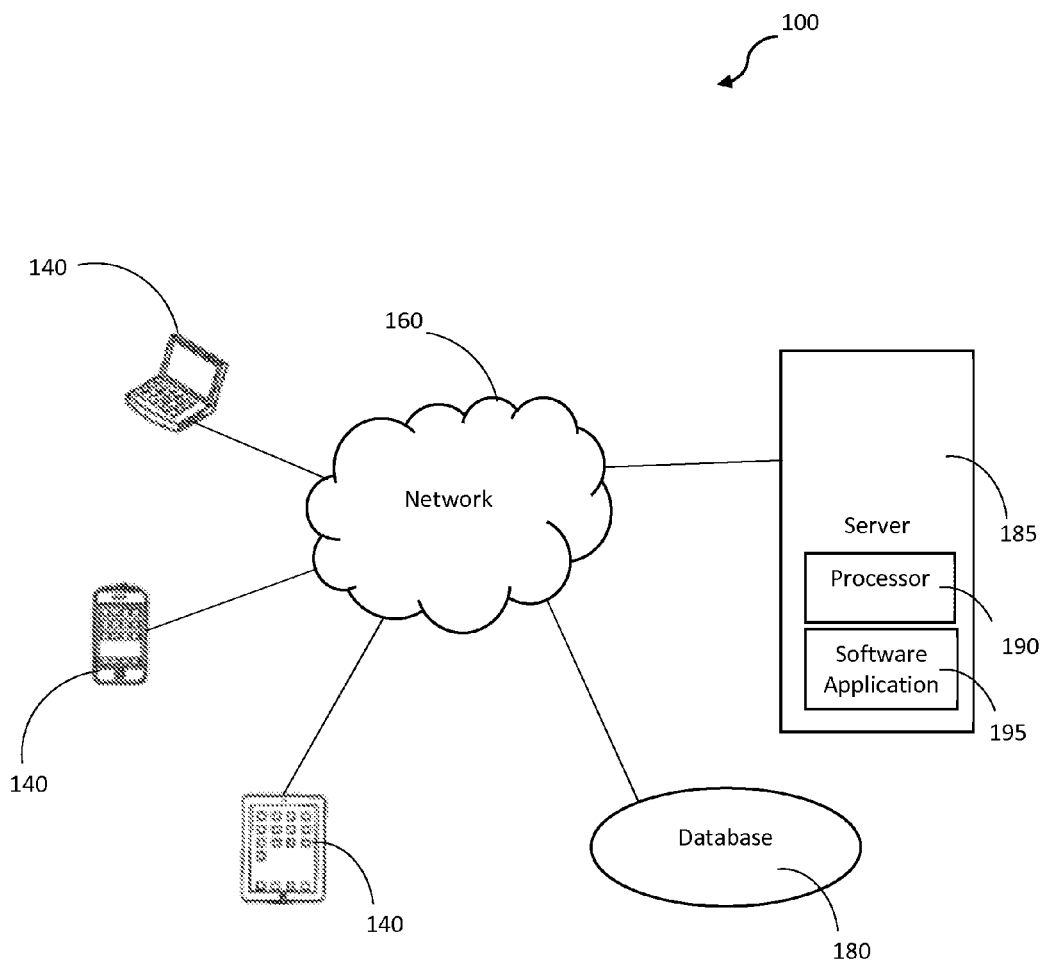
FIG. 1 is a diagrammatic illustration of an environment of the present invention in accordance to one of the preferred embodiments.

As shown in the accompanying drawings, the present invention is generally directed to a system and method to authenticate an electronic message to a recipient in a sender's handwriting. More particularly, FIG. 1 illustrates a system 100 to authenticate at least one electronic message to a recipient in a sender's handwriting. As such, the sender's handwriting is in an electronic format. The sender's handwriting in the electronic format defines a sender's electronic handwriting message. Accordingly, in one of the preferred embodiments, the system 100 has a server 185 including a processor 190. The processor 190 is configured to help the server 185 execute a plurality of software programs including application programs necessary to operate on at least one electronic device connected to the server via a network 160. Accordingly, in one of the preferred embodiments, the server 185 can comprise a large mainframe, a mini-computer cluster, or a group of servers functioning as one unit. As such, the server 185 is configured to share data, information and/or store a plurality of software application data and resources, including but not limited to software application(s) related to the system and method(s) of the present invention. Moreover, the server 185 is configured to provide content, web-based applications, user interfaces ("UIs"), web pages, process data, and/or facilitate. Given all this, in one of the preferred embodiments, the server 185 can be accessed over the network 160. As such, the network 160 can comprise one or plurality of communication networks that can be linked and communicate with each other, including a combination of local area network (LAN) and wide area network (WAN). Additionally, the network 160 may also comprise of wired and wireless communication systems, including but not limited to cell phone networks, Wi-Fi local networks and terrestrial microwave networks. Consequently, the network can be implemented using a plurality of protocols, including but not limited to Attached Resource Computer Network (ARCNET), Multi-protocol label switching (MPLS), Asynchronous Transfer Mode (ATM), Bluetooth, Transmission Control Protocol/Internet Protocol (TCP/IP), DECnet, Ethernet, User Datagram Protocol (UDP), Fiber Distributed Data Interface (FDDI), Hypertext Transport Protocol (HTTP), Frame relay, Simple Mail Transfer Protocol (SMTP), FireWire, File transfer Protocol (FTP), Internet Protocol Suite (IPS), Internetwork Packet Exchange (IPX) and Universal Serial Bus (USB).

Furthermore, the server 185 may have a mixture of analog and digital interfaces. It can support a plurality of users, including processing their unique identifications. Given this, the server 185 is configured to provide a unique identification to each user, when the user accesses the software application stored on the server. Accordingly, in one of the preferred embodiments, a user may comprise of various types of users, including at least one user or an electronic handwriting message sender or simply a sender who composes, converts, encrypts and transmits an electronic handwriting message of the sender via any web based electronic mailing service. Similarly, the user may also comprise at least one recipient user or electronic message recipient user or simply a recipient who receives and decrypts the electronic message transmitted by the sender via any web based electronic mailing service. Examples of web-based electronic mailing service include but are not limited to HOTMAIL, GMAIL, WEBMAIL, AOL, or MSN. Accordingly, the electronic message of the sender, before it is converted into the sender's electronic handwriting message, can be composed in various ways including but not limited to typing, dictating, texting, scanning, writing on an interactive screen of a tablet, or other ways to compose the electronic message on the user interface of the electronic device. Additionally, while, for convenience, some of the preferred embodiments of the present invention have herein been described in context of the user interface of any web based email service, embodiments of the present invention are equally applicable to various other electronic commerce architectures, mobile commerce architectures, social media commerce architectures, and other structures outside of web based email service as well.

Moreover, in accordance to one of the preferred embodiments, the system 100 comprises a software application 195. In this preferred embodiment, the software application 195 can be stored on the server 185. As such, the server 195 can be on a local network or remote cloud-based network. Accordingly, accessing the software application 195 in one of the preferred embodiments can be accomplished over the network 160. Given this, an electronic device 140, a server 185 and a database 180 can all access the network 160, sufficient to enable a seamless, virtual communication to transfer and share electronic data. Alternatively, in other preferred embodiments, the software application 195 can be located locally on at least one electronic device 140 or a local server (not shown). In this embodiment, however, it would not be necessary for the user to access the software application 195 stored on the server 185 over the network 160. Also, in one of the preferred embodiments, data pertaining to the user's electronic handwriting can be stored and located locally on the hard drive or external drive (not shown) of the electronic device 140. Accordingly, the electronic device 140 may typically include, but is not limited to computers, laptops, mobile phones, televisions, tablets, game consoles, personal digital assistants, watches, wireless devices, network PC's, programmable consumer electronics, Internet appliances, or any other devices that can provide user access to operating systems, browsers, user interfaces and/or a combination thereof. As such, in one of the preferred embodiments, the electronic device 140 is connected to the network 160, wherein the electronic device 140 comprises a user interface (not shown) for the sender and the recipient to communicate via electronic messaging. As such, the electronic messaging may be conducted on various types of commercially available electronic messaging services, devices and platforms. Given all this, the software application 195 of the present invention can be provided as a self-hosted perpetual model with service support. Under this model, the user (sender and/or recipient) would purchase the software application to be installed locally on the electronic device. Alternatively, however, the software application 195 of present invention can be provided over the network 160 via the remote server 185, to be accessed from anywhere around the world. As such, the software application 195 accessed over the network 160 may be updated automatically without any interference from the user (sender or recipient with access to the software application 195). Additionally, the software application 195 may also employ different programming languages, or combinations thereof, to perform some of the methods of the present invention, including but not limited to AWK, Pearl, Python, JAVA, HTML, TXL, XSLT, C, C++, and C#.

Figure 2A:
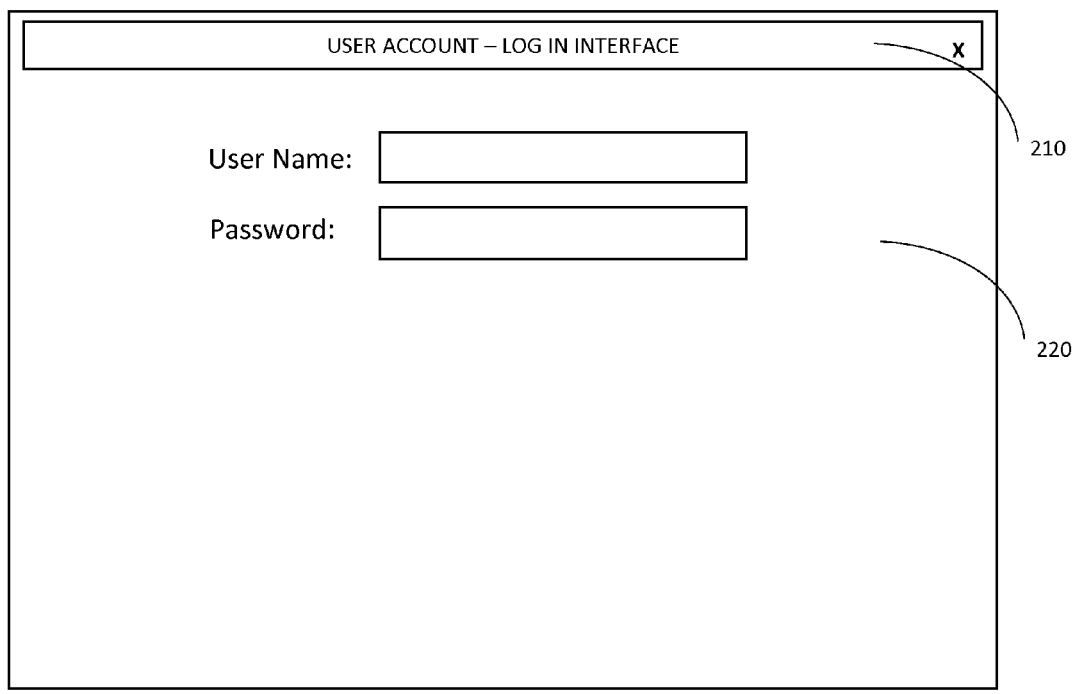
FIG. 2A is an illustration of the log in interface of the graphic user interface of the software application in accordance to one of the preferred embodiments.
Figure 2B:
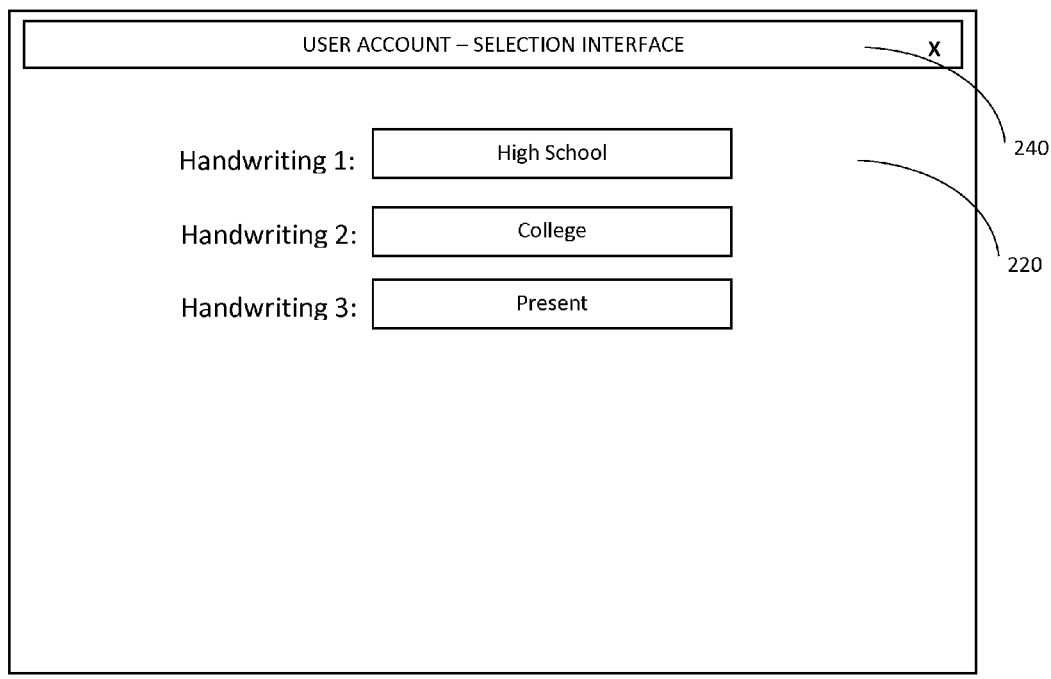
FIG. 2B is an illustration of the selection interface of the graphic user interface of the software application in accordance to one of the preferred embodiments.
Figure 2C:
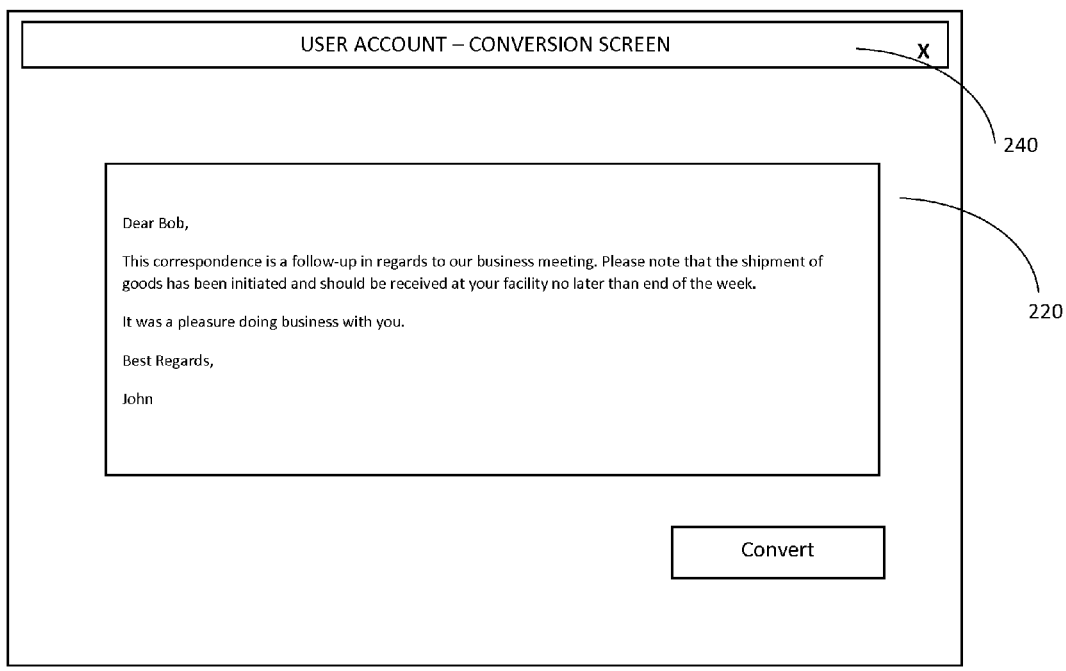
FIG. 2C is an illustration of the conversion interface of the graphic user interface of the software application in accordance to one of the preferred embodiments.

Given all this, in one of the preferred embodiments, the software application 195 comprises a graphic user interface ("GUI") 220 as shown in FIG. 2A. The GUI 220 of the software application displays and guides the user through the identification, conversion, formatting, encryption and decryption methods. More specifically, the GUI of the software application 195 comprises at least one interface, which is configured to display and guide the user through the aforementioned methods. As such, each of these methods will be subsequently described in greater detail. Furthermore, the GUI 220 of the software application 195 is configured to display at least one electronic handwriting of the sender. Accordingly, as shown in FIG. 2B the GUI 220 of the software application 195 displays a variety of sender's electronic handwritings ranging from middle school, high school, college, first job, and/or the present, provided that the characters/character sets of such handwriting(s) have been prior processed and uploaded on the server 185 of the software application 195 for selection purposes. Given this, in one of the preferred embodiments, the GUI 220 of the software application 195 can display to the sender various options of the sender's electronic handwriting to select from. Having a larger selection of electronic handwritings can help the software application 195 generate a larger number of encryption codes in some preferred embodiments. This is because in one of the preferred embodiments, the sender's electronic handwriting itself may directly affect how the sender's electronic handwriting message is encrypted. As a result, more electronic handwritings of the sender could mean more options to encrypt from.

Referring back to FIG. 1 again, in one of the preferred embodiments the system 100 of the present invention also comprises a database 180. The database 180 is configured to store information related to the sender's handwriting. The database 180 is in a communicating relation with the server 185. In other words, the server 185 and the database 180 are configured and operable to communicate with each other virtually over the network 160. As such, this communication between the server 185 and database 180 over the network 160 may be sufficient for the server to retrieve data related to the sender's electronic handwriting stored on the database 180. As such, the server 185 including the processor 190 can be configured to process the sender's electronic handwriting information to be displayed on one of the interfaces of the GUI 220 of the software application 195. Accordingly, in one of preferred embodiments, the database 180 may comprise of a plurality of electronic files that are designed and modeled to support the system 100 and method(s) of the present invention. Given this, the database 180 can be used as a storage of all information related to the user's electronic handwriting. Additionally, the hard drive, other external drive (not shown) of the electronic device 140 of the sender and/or a database on the local network (not shown) can also be operable to store all information, including the electronic files pertaining to the sender's electronic handwriting.

Figure 4:
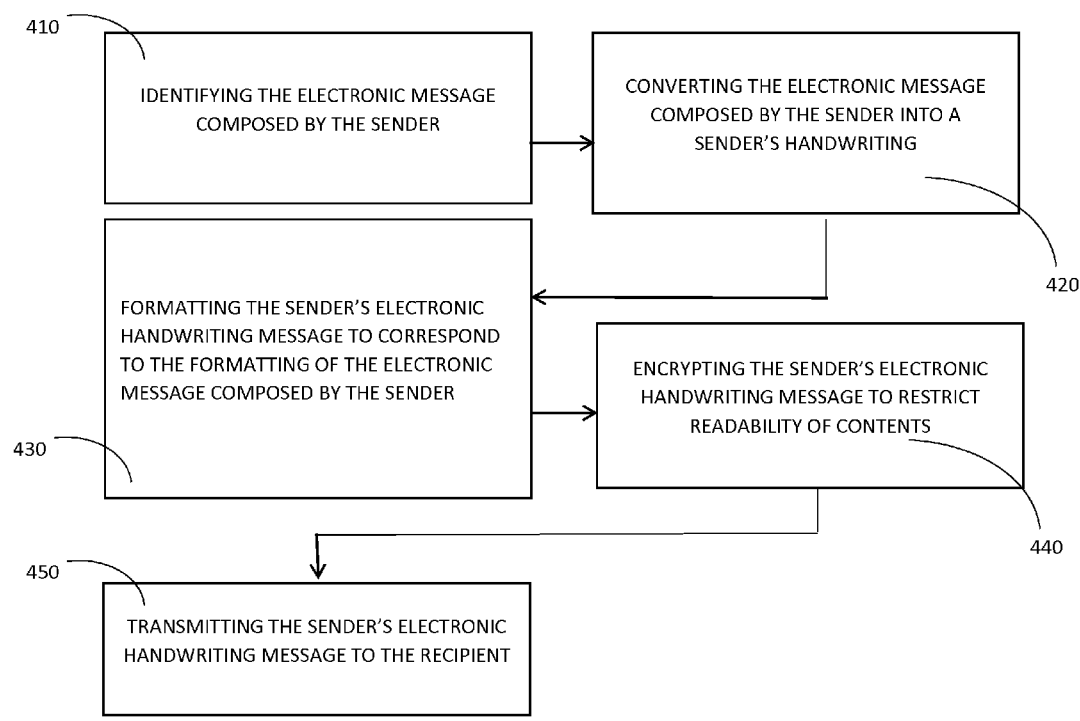
FIG. 4 is an illustration of instructions that the system including the processor and the software application are configured to take in accordance to one of the preferred embodiments.

Furthermore, referring to illustrations in FIG. 1 and in FIG. 4, in one of the preferred embodiments, the server 185 including the processor 190 and the software application 195 are configured to execute instructions related to: identifying the electronic message composed by the sender 410, converting the electronic message composed by the sender into a sender's handwriting 420, formatting the sender's electronic handwriting message to correspond to the formatting of the electronic message composed by the sender 430, encrypting the sender's electronic handwriting message to restrict readability of contents 440, and transmitting the sender's electronic handwriting message to the recipient 450. As such, each of these instructions will be explained in greater detail below.

Accordingly, referring again to FIG. 1 and FIG. 4, in one of the preferred embodiments, the server 185 including the processor 190 and the software application 195 are configured to execute instructions related to identifying the electronic message composed by the sender 410. As such, the identifying the electronic message composed by the sender 410 further comprises the sender composing the electronic message on the user interface of the sender's account on the web based email service. Furthermore, referring to illustration FIG. 3A and FIG. 2A, upon composing the electronic message on the user interface 320 of the web sender's account on web based email service, the sender can use an embedded widget 300 of the software application 195 provided on the user interface 320 of the web based email service to initiate the GUI 220 of the software application 195. This means that activating the embedded widget 300 initiates the GUI 220 of the software application 195. So then once initiated, the sender will be directed to the GUI 220 of the software application 195, where a log in interface 210 prompting the sender to "log in" into the sender's account will be displayed as illustrated in FIG. 2A. Upon logging in, the GUI 220 of the software application 195 is configured to show a selection interface 240 of at least one sender's handwriting option of the user to be selected from. Again, the options on this selection interface 240 will depend on the different types of handwriting styles the sender may have already uploaded and stored electronically.

Figure 3A:
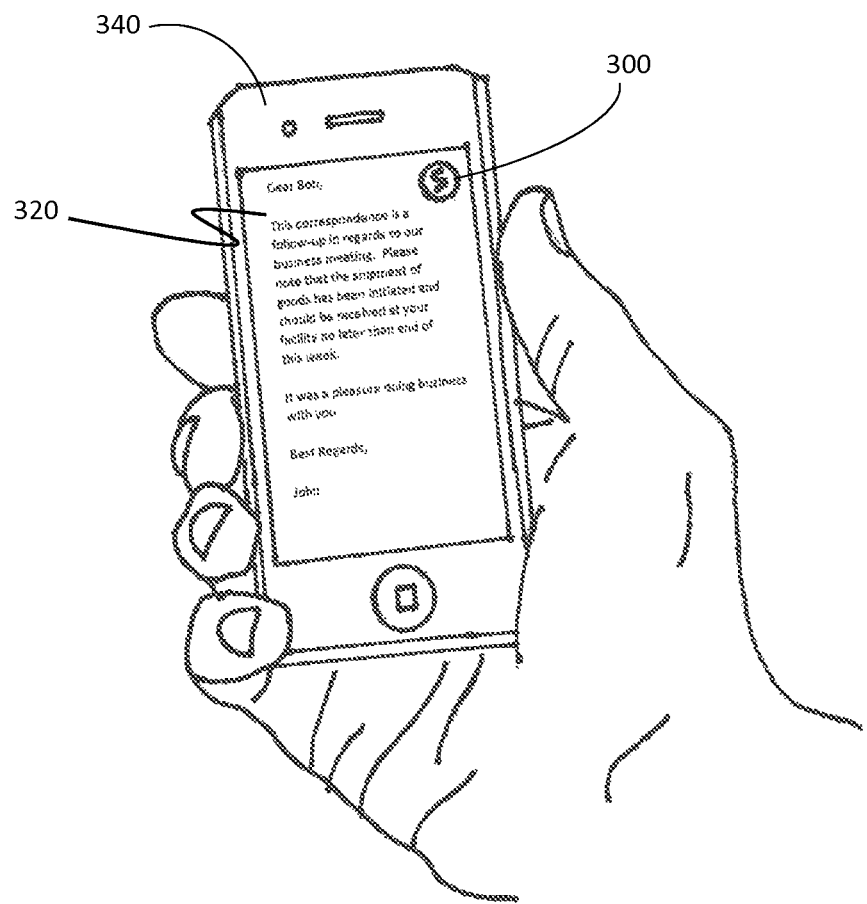
FIG. 3A is an illustration of the embedded widget of the software application incorporated within the user interface of the user's web based electronic mail account in accordance to one of the preferred embodiments.
Figure 3B:
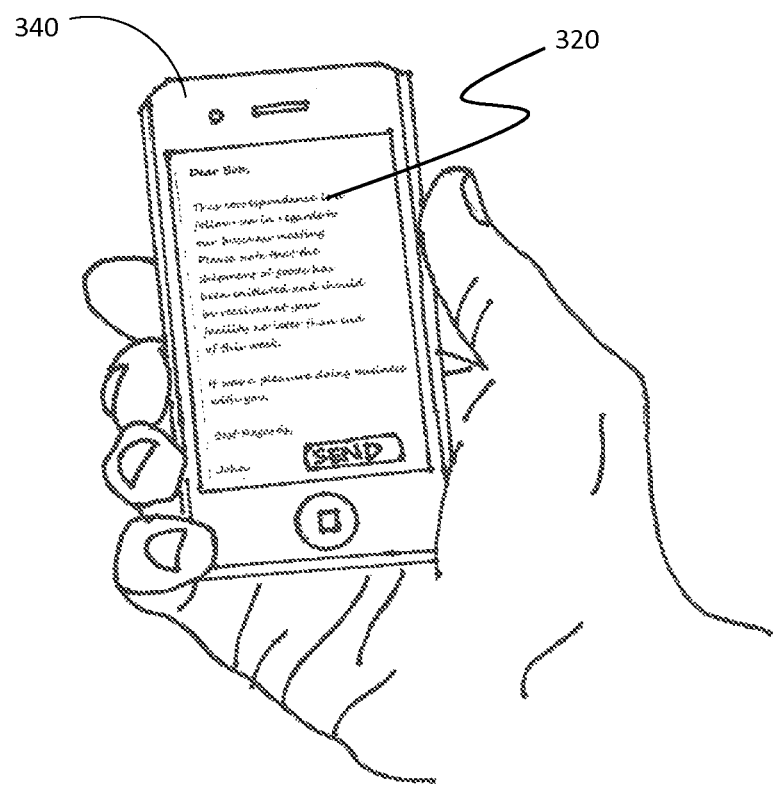
FIG. 3B is an illustration of the sender's electronic handwriting message after the electronic message composed by the sender has been converted by the software application using the sender's handwriting in an electronic format in accordance to one of the preferred embodiments.

Accordingly, referring again to FIG. 1 and FIG. 4, in one of the preferred embodiments, the server 185 including the processor 190 and the software application 195 are configured to execute instructions related to converting the electronic message composed by the sender into a sender's handwriting. The sender's handwriting is in an electronic format. As such the sender's handwriting in the electronic format defines a sender's electronic handwriting message. Accordingly, the selection interface 240 of the GUI 220 of the software application 195 allows the sender to select from at least one of sender's handwritings in the electronic format ("sender's electronic handwriting"). Upon selecting the preferred sender's handwriting in the electronic format, the server 185 will communicate with the database 180 over the network 160, where the sender's handwriting in the electronic format is stored. The server 185 including the processor 190 will then process and retrieve the sender's handwriting in the electronic format from the database 180. Accordingly, the server 185 is configured to retrieve the sender's electronic handwriting from the database 180. Accordingly, FIGS. 3A and 3B, illustrate one of the preferred embodiments in which once the desired electronic handwriting selected by the sender is retrieved, the software application 195 converts the electronic message composed by the sender on the user interface 320 of the sender's account on the web email service or other interfaces on other electronic message applications with user interfaces, to correspond to the sender's handwriting in the electronic format. As such the sender's handwriting in the electronic format defines a sender's electronic handwriting message. Accordingly, the software application 195 is configured to convert the electronic message composed by the sender to correspond to the sender's electronic handwriting message. More specifically, the software application 195 is designed to identify the composed (typed, dictated or otherwise) electronic message of the sender, and consequently, convert the composed electronic message to resemble the sender's handwriting in the electronic format, defined as the sender's electronic handwriting message.

Furthermore, referring to FIG. 1 and FIG. 4, in one of the preferred embodiments, the server 185 including the processor 190 and the software application 195 are configured to execute instructions related to formatting the sender's electronic handwriting message to correspond to the formatting of the electronic message composed by the sender 430. More specifically, the software application 195 is configured to format the sender's electronic handwriting message to correspond to the formatting of the electronic message composed by the sender. For instance, after converting the electronic message composed by the sender to correspond the sender's electronic handwriting message 420, the formatting of the sender's electronic handwriting message may not aesthetically match in regards to the character/character set size, height, width, or other dimensions. As such, the software application 195 is configured to format the sender's electronic handwriting, so as to enable it to stylistically accommodate within the existing user interface environment 320 of the web based electronic mail service. As such, the software application 195 is configured to allow the sender's handwriting in the electronic format to correspond to the formatting of the electronic message composed by the sender. Alternatively, in other embodiments, the user may also be able to manually format the sender's electronic handwriting message to correspond to the electronic message composed by the sender. As such, this may be preferably accomplished once the sender's electronic handwriting message is transferred on to the user interface 320 of the web based electronic mail service for transmission to the recipient.

Furthermore, in one of the other preferred embodiments, the sender can "copy" the initially composed electronic message from the user interface 320 of the web based email service and "paste" the copied message directly onto GUI 220 of the software application 195. As such, the software application 195 is configured and programmed to directly accept the copied composed electronic messages within its user interface 320. Accordingly, as illustrated in one of the preferred embodiments in FIG. 2B, once the sender has logged into the sender's individual account on the software application, the GUI 220 of the software application 195 will display at least one of sender's handwritings in the electronic format that has been prior processed and stored on the database. Given this, instructions related to converting and formatting of the sender's composed electronic message transferred into the software application 195 will preferably occur, once the appropriate selection of sender's electronic handwriting has been made by the sender on the selection interface 240 of the GUI 220 of the software application 195.

Next, as illustrated in FIG. 1 and FIG. 4, in one of the preferred embodiments, the server 185 including the processor 190 and the software application 195 are configured to execute instructions related to encrypting the sender's electronic handwriting message to restrict readability of contents 440. Accordingly, the software application 195 configured to generate at least one hash code (not shown) to be embedded in the sender's electronic handwriting message. More specifically, the software application 195 generates the hash code and preferably inserts it along the bottom edge of the sender's electronic handwriting. Message. Additionally, in one of the preferred embodiments, the software application 195 is configured to generate at least one hash code to be embedded in the sender's electronic handwriting message. Even further, in some preferred embodiment, the software application 195 is also configured to locate and identify the hash code embedded in the sender's electronic handwriting message. However, the hash code may not visible to the naked eye, and as such, will not be expressly displayed anywhere in the sender's electronic handwriting message or on any of the interfaces of the GUI 220 of the software application 195, despite its ubiquitous presence. As such, the hash code may implicitly represent as a "stamp" of sorts that allows the sender's electronic handwriting to serve as an encryption. Alternatively, in other embodiments, the hash code may be positioned at different locations within the formatted sender's electronic handwriting. Additionally, in other preferred embodiments, the hash code may also be visible to the naked eye. So then given all this, once the hash code is generated and embedded, the software application 195 is configured to locate and identify the hash code embedded in the sender's electronic handwriting. In other words, the remote recipient of the sender's electronic handwriting message uses the software application to successfully locate and identify the embedded hash code. In addition, in some other preferred embodiments, the recipient also uses the software application to decrypt the encryption embedded in the sender's electronic handwriting message to decipher its contents.

In one of the preferred embodiments, at least one hash code is configured to provide at least one encryption algorithm. As such, the encryption algorithm may comprise, but is not limited to a proprietary score, a known code and a visual identifier. More specifically, the proprietary score is based on the handwriting style of the user. The proprietary score is applied against a two-dimensional (flattened) samples of the user's electronic handwriting. As such, for purposes of simplicity the proprietary score will be referred to as an "A" code. Accordingly, in this preferred embodiment, the user's handwriting in the electronic format itself will serve as an encryption algorithm of the A code. Given this, the A code can be generated using a "score system" based on the user's handwriting in the electronic format. Consequently, the score system of the A code is also used to unlock or decrypt an existing encrypted electronic message of the user. More particularly, in one of the preferred embodiments, the A code is generated by using the score system by generating a score using the user's unique handwriting. In other words, the software application is configured to create a score, based on each user's unique handwriting style in the electronic format. So for instance, a user X may have a score of 50 based on the user X's unique handwriting, while user Y may have a score of 80 based on the user Y's handwriting. Accordingly, the score system keeps tally of each of the user's handwriting styles based on a score over a period of time. This score is computed in real time as and when the user inputs all the necessary character sets of the user's handwriting in the electronic format into the software application. In other words, the score of the user's handwriting in the electronic format may change based on the completeness of all the character sets entered by the user. So for instance, if the user has not entered all the characters, the score may be not completely computed. As such, once all the character sets of the user's handwriting are entered by the user and recorded by the software application 195, the score system can create the A code based on the total score of that particular users specifically. Again, this score is accurately assessed based on the user's unique handwriting. Therefore, in one of the preferred embodiments, once the user provides a comprehensive character list of the user's handwriting to the software application 195 electronically, the server 185 including the processor 190 processes this information using the software application 195. Then, all the handwriting characters of the user are recorded electronically and given a score. As such, the software application 195 is configured to generate the A code based on the user's score.

Figure 9:
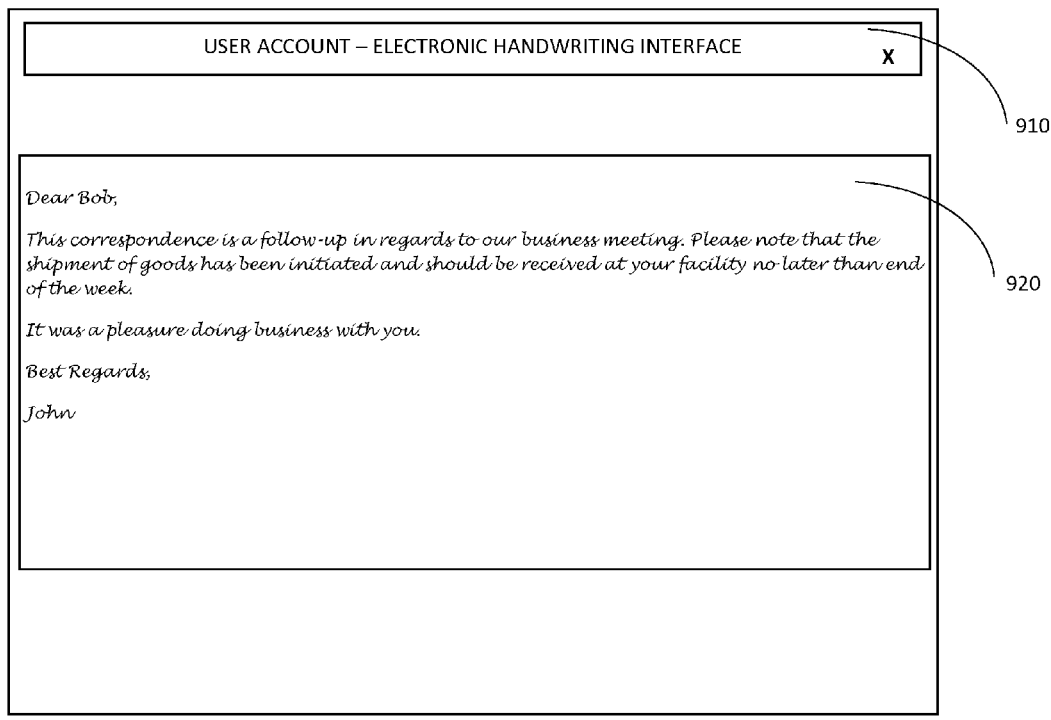
FIG. 9 is an illustration of one the electronic handwriting interface of the graphic user interface of the software application in accordance to one of the preferred embodiments.

Furthermore, in one of the preferred embodiments, the A code permits the user to unlock or decrypt the user's electronic message in its encrypted form. More specifically, as the user enters his own handwriting electronically in the software application 195, the software application 195 is configured to analyze the user's handwriting in the electronic format. If the user's handwriting electronically entered matches the score for the user's electronic handwriting message, the A code is decrypted. Furthermore, because the A code can be replicated by the user at any remote location given the fact that the user has immediate access to the user's own handwriting, in one of the preferred embodiments, no network 160 to connect to the server 185 and/or database 180 to retrieve the A code is required. More specifically, in one of the preferred embodiments, in which the software application 195 is locally located on the electronic device 140, the user may not be required to connect to the server 185 over the network 160 in order to retrieve any of the sender's handwriting in the electronic format stored in the database 180. In other words, once the sender has virtually "downloaded" the sender's electronic handwriting message locally to the electronic device 140 in its encrypted form with the A Code, there is no requirement to upload it again in order to decrypt it. The user can simply use the user's own handwriting in the electronic format and match the score allocated to the user's electronic handwriting message encrypted with the A code. Naturally, since the user's handwriting in the electronic format is identical to the electronic handwriting message encrypted with the A code, the message can be successfully decrypted. So for instance, to achieve a matching score in efforts to decrypt the A code, the user's handwriting in this preferred embodiment can be achieved with the use of a stylus pen or user's fingers, to write electronically on an user interactive screen ("touch screen") of the electronic device 140. More specifically, the electronic device 140 may comprise the touch screen configured to permit the user to write electronically using the stylus pen or the user's fingers in user's handwriting directly on the GUI 220 of the software application 195. As such, referring to FIG. 9, in one of the preferred embodiments, the GUI 920 of the software application 195 comprises an electronic handwriting interface 910 allowing the user to electronically handwrite directly thereon. So then, in this preferred embodiment, the software application 195 is configured to allow the user to electronically handwrite within its GUI 920. Accordingly, if the user's handwriting electronically composed on the electronic handwriting interface 910 matches the user's electronic handwriting message encrypted with the A code in terms of the score of the score system, the message will be decrypted instantly allowing the user to read its contents. Again, in this preferred embodiment, all this can be accomplished locally without the need for the network 160 due to the fact that all the information including the encrypted message has been downloaded locally on the electronic device 140. Also, in this preferred embodiment, the software application 195 may be located locally on the electronic device 140 as well.

Next, in one of the other preferred embodiments, the known code may serve as a public key certificate. As such, for purposes of simplicity the known code can also be referred to as a "B" code. The B code is configured to assist the remote recipient in decrypting the sender's electronic handwriting message, once it is received by the recipient. Given this, the B code may be only used for to encrypt the sender's electronic handwriting message when a viable network exists. More particularly, the B code can be generally used to encrypt the sender's electronic handwriting message when it is transmitted across the network to the recipient. Furthermore, the B code, although similar to the public key certificate, can be as arbitrary as a number, a code, an image, or a formula. Accordingly, the B code is randomly generated by the software application to be distributed to the recipient. As such, the recipient can effectively decrypt the sender's electronic handwriting message by entering the identical number, code, image, or formula to match the encrypted certificate of the B code.

Even further, in one of the preferred embodiments, the visual identifier is embedded on a certain point with the script of each character or word in the sender's electronic message. As such, for purposes of simplicity the visual identifier can also be referred to as a "C" code. The C code may function as a checksum or validator to ensure that the sender's electronic message is genuine and has not been decoded before. Additionally, the C code is able to diagonally "stamp" the sender's electronic message and may include, but is not limited to a date code, a watermark, or a combination thereof. The C code allows the sender to enhance the authenticity of the sender's electronic handwriting message, when it is remotely decoded by the recipient. As such, the C code is generated as a unique checksum for each and every electronic message based on the number of letters, space, words, and characters there are in the sender's handwriting. So for instance, in one of the preferred embodiments, codes are strategically embedded between words and letters at certain X and Y coordinates on the two dimensional plane of the sender's electronic handwriting message. More specifically, the codes are embedded at certain coordinates between certain words or characters of the sender's electronic handwriting message. Accordingly, during the process of decoding by the recipient on the remote end, the C codes are stripped from the originally encrypted format and computed for validation. As such, in one of the preferred embodiments, the computation of the codes can be based on the sum of the coordinates the codes are positioned within the electronic sender's message. For instance and merely as an example, if the sender's electronic handwriting message is represented as a two-dimensional plane, and if the C code X is placed on coordinates (1,2) and (4,1) of the two dimensional electronic handwriting message plane, the sum of these X and Y coordinates would result in (A+B)=(5,3). Accordingly, in this example, the C code would be encrypted as the sum (5,3). As such, when the recipient receives the message and commences decryption, any other sum besides (5,3) at which the C code is identified at, can conclude that the message is not authentic. Alternatively, in this preferred embodiment, once the electronic message is received and the recipient commences decryption, if the C code results to the sum (5,3) as illustrated in the example above, it may signify that the sender's electronic message is genuine, and therefore further validated.

Additionally, in other preferred embodiments, the C code can be used as an additional buffer and encrypted in combination with A and B codes. Therefore, in this preferred embodiment, the sender may transmit the electronic handwriting message to the recipient that has been encrypted by a combination of codes, namely, A code and C code and/or B code and C code. In addition, a combination of codes can also be typically generated for encryption in situations where privacy and security of the electronic message is paramount and the information contained in the message is highly classified.

Moreover, referring to illustrations in FIG. 1 and FIG. 4, in one of the preferred embodiments, the server 185 including the processor 190 and the software application 195 are configured to execute instructions related to transmitting the sender's electronic handwriting message to the recipient 450. More specifically, the software application 195 is configured to prompt to the sender to transfer the sender's electronic handwriting message back to the user interface 320 of the user account on the web based electronic mail service 140. As such, this is one of the preferred embodiments, in which the sender's electronic handwriting message can be transmitted to its intended recipient(s) via electronic mail. Accordingly, the transfer of the sender's electronic handwriting message can be automated by activating an embedded widget (not shown) of the web mail service provider or other electronic message transmitting applications on the GUI 220 of the software application 195. This allows the software application 195 to directly transfer the sender's electronic handwriting message back into the sender's web mail service user interface for it to be transmitted. More specifically, the software application 195 can be configured to communicate with the sender's web mail service, sufficient to transfer the sender's electronic handwriting message into the user interface 320 of the web mail service. However, in order to accomplish this, the sender may be required to first log into the sender's user account on the web mail service. Alternatively, in other preferred embodiments, once the sender's electronic handwriting message is ready to be transmitted, the sender may execute an electronic "copy" and "paste" function. This can be executed by electronically copying the sender's electronic handwriting message from the GUI 220 of the software application 195 and electronically pasting it into the user interface 320 of the sender's account on the web mail service. As such, in other preferred embodiments, the software application 195 may comprise the embedded widget of a third party electronic mail service carrier (not shown) incorporated within the GUI 220 of the software application 195. Given this, the electronic mail service carrier can be HOTMAIL, GMAIL, WEBMAIL, OUTLOOK, AOL, MSN, and the like. So then, once the sender's electronic handwriting message is pasted on to the user interface 320 of the sender's web mail service, the sender inputs the intended recipient's email address within the user interface 320 of the sender's web email service. Then, the transmission of the sender's electronic handwriting message is completed, when the sender hits the "send" button within the user interface 320 of the sender's account on the web mail service.

Conversely, as illustrated in FIG. 3A, in one of the preferred embodiments, an embedded widget 300 of the software application 195 can also be incorporated within the user interface(s) 320 of the third party electronic mail service carriers/providers. For example, the embedded widget 300 may be embedded and displayed on the user interface 320 of the web mail service, such that when the sender activates the widget 300 embedded therein, the software application 195 initiates its GUI 220 of the software application 195, further allowing the sender to convert the composed electronic message into the sender's electronic handwriting message. As such, referring now to FIG. 2A, in this preferred embodiment, it may necessitate for the user to have already logged into the software application 195 via the log in interface 210 of the GUI 220 of the software application 195, allowing the software application 195 to remain actively operable. Accordingly, this enables the sender to activate the GUI 220 of the software application 195 immediately to transfer the electronic message composed by the sender for conversion into the sender's electronic handwriting message and/or encrypting the sender's electronic handwriting message.

Figure 5:
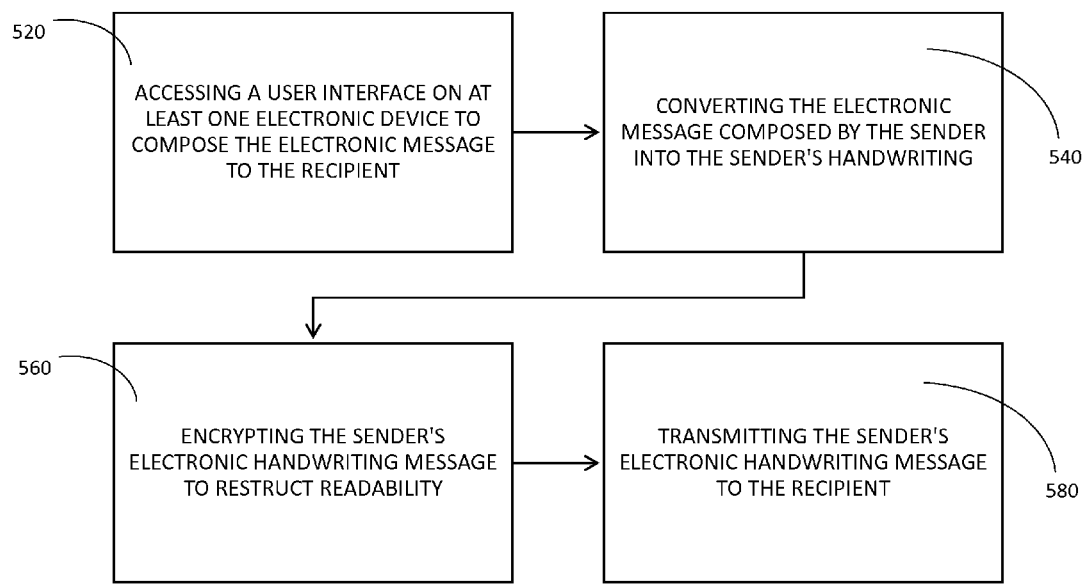
FIG. 5 is a flowchart directed to another method of the present invention in accordance to one of the preferred embodiments.

Referring now to the illustrations in FIG. 5, in one of the preferred embodiments, the method to authenticate an electronic message composed by the sender to a recipient in the sender's handwriting includes accessing a user interface on at least one electronic device to compose the electronic message to the recipient 520. More specifically and merely as an example, the sender initiates the user interface of web based electronic mail service on the electronic device by accessing its email server over the network. Next, the user logs into the user account to compose an electronic email. This means that the user can use various methods including but not limited to typing or dictating to compose the electronic message. However, the user interface is not limited in this preferred embodiment. As such, the sender may compose the electronic message on various other commerce architectures with the user interfaces that allow the sender to compose an electronic message. Furthermore, the sender accesses the software application 195 by initiating a separate GUI 220 of the software application 195. More specifically, in one of the preferred embodiments, the sender may activate the GUI 220 of the software application 195 by "double clicking" on a separate software application 195 icon (not shown) on the interface of the electronic device. Alternatively, however, as shown in FIG. 3A, in one of the other preferred embodiments, the sender may activate the GUI 220 of the software application 195 by "clicking" on the embedded widget 300 of the software application as an option within the user interface of the virtual email service account. As such, by either of two methods, the sender accomplishes to access the GUI 220 of the software application 195, so that the electronically composed message can be converted into sender's electronic handwriting message. More particularly, as illustrated in FIGS. 2A and 3A, and in one of the preferred embodiments, once the sender has clicked on the software application 195 icon or embedded widget 300, the software application 195 introduces the sender to negotiate through the log in interface of the GUI of the software application. As such, the sender inputs a username and password specifically associated with the sender's account within the software application 195. Negotiating past the log in interface 210 of the GUI 220 of the software application 195 allows the software application 195 to validate the sender (or a license therein), enabling the sender to negotiate through the proceeding interfaces of the GUI of the software application 195. Moreover, this may allow the software application 195 to particularly identify the sender, generating only the relevant information pertaining to the sender's electronic handwriting stored locally or on the database 180 over the network 160. Alternatively, in other preferred embodiments, the sender may not require negotiating via the log in interface 210. More specifically, in this preferred embodiment, if the software application 195 is stored locally on the sender's electronic device 140, i.e., the software application 195 is not stored on the server 185 over the network 160, the software application 195 can direct the sender negotiating through the log in interface of the GUI 220 of the software application 195. As such, the sender may be directed directly onto the next interfaces of the GUI 229 of the software application 195.

Referring again to FIG. 5, in one of the preferred embodiments, the method to authenticate an electronic message composed by the sender to a recipient in the sender's handwriting further comprises converting the electronic message composed by the sender or any other composer into the sender's handwriting 540. As such, the sender's handwriting is in an electronic format. Accordingly, the electronic format defines a sender's electronic handwriting message. More specifically, the software application 195 is configured to replace each character set of each word of the electronic message composed by the sender to correspond to each character set of each word in the sender's handwriting in the electronic format, found in the database. Accordingly, the sender "copies" and "pastes" the electronic message composed by the sender into the GUI 220 of the software application 195. As such, and as illustrated in FIG. 2B, the sender then selects from at least one of sender's handwriting that is yielded on the selection interface 240 of the GUI 220 of the software application 195 to be converted. More particularly, once the server 185 processes the sender's particular account, the server 185 including the processor 190 retrieves the sender's handwriting information in the electronic format from the database 180 over the network 160. As such, in order to retrieve the sender's handwriting in the electronic format, the server 185 is configured to communicate with the database 160 over the network 160. Alternatively, however, in some other preferred embodiments, the sender's handwriting in the electronic format information is located locally on the electronic device 140 and does not require the server 185 to communicate with the database 180 over the network 160. Additionally, in one of the preferred embodiments, the selection of the sender's handwriting in the electronic format directly corresponds to the sender's handwriting in the electronic format located on the database 180 and/or on the electronic device 140. In other words, the sender may be able to access the sender's handwriting in the electronic format provided that a comprehensive list of sender's handwriting characters/character sets in the electronic format have already been electronically processed and uploaded by the server 185 in the database and/or locally on the electronic device.

Figure 8:
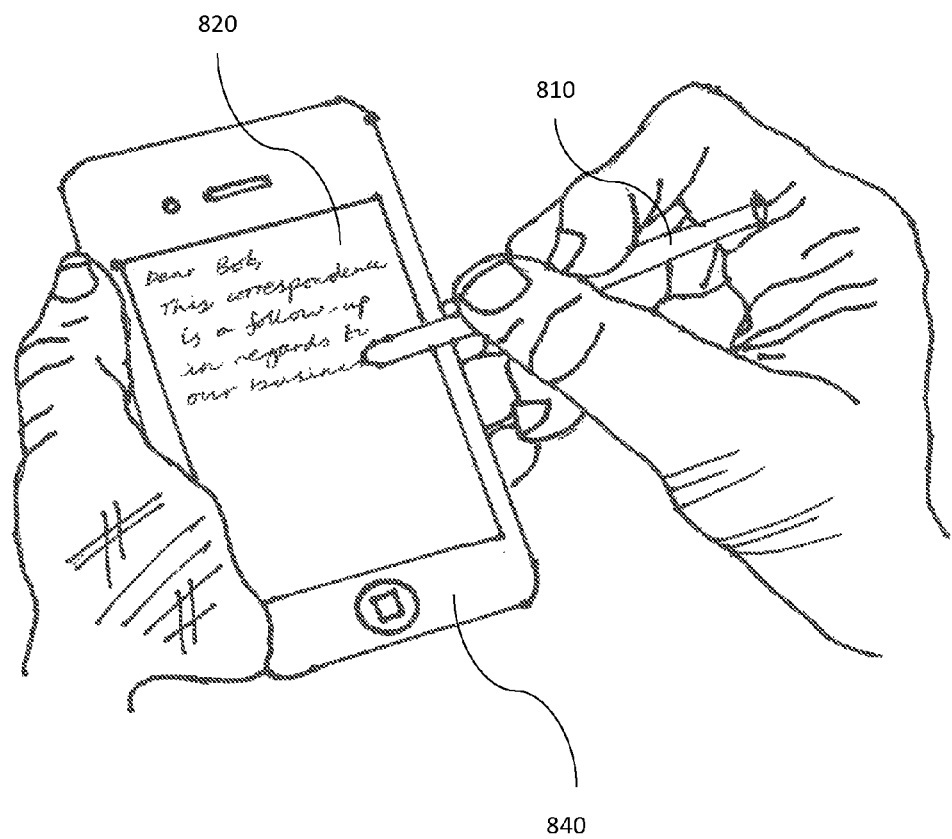
FIG. 8 is an illustration of electronic handwriting on an interactive user interface of an electronic device using an interactive tool in accordance to one of the preferred embodiments.

Accordingly, in one of the preferred embodiments, the sender is able to access and select the sender's handwriting primarily by uploading the sender's actual handwriting into an electronic format. For instance, and as illustrated in FIG. 8, in one of the preferred embodiments, using an electronic interactive pen 810 ("stylus pen") on an interactive electronic screen 820 ("touch screen") of an electronic device 840 ("tablet computer"), the sender composes a message electronically on the interactive electronic screen by incorporating all the characters sets of the sender's actual handwriting in the electronic format. By doing this, the server 185 is able to process the character sets of the sender's handwriting electronically and store them on the database accordingly. More specifically, this is done by identifying and then uploading all each and every character and character set of the sender's handwriting in the electronic format and store them on the database under the sender's account. Given this, once the sender's handwriting in the electronic format containing a comprehensive list of all of sender's handwriting characters or character sets is communicated to the server 185, it identifies the characters, consequently uploading them electronically to be stored on the database over the network. As such, the comprehensive sample size of characters once uploaded, allows the sender to successfully convert all of the sender's consequently composed messages into sender's electronic handwriting. Accordingly, using the software application 195, the server 185 replaces each character set of each word of the electronic message composed by the sender to accurately correspond to each character set of each word in the sender's electronic handwriting found in the database 180. For instance, if the electronically composed message contains the word "system", this word will be replaced to correspond to the word "system" in the sender's handwriting in the electronic format (cursive or otherwise depending on the sender's actual handwriting style). Consequently, by replacing each character/word to correspond to the character/word of sender's handwriting, it is ensured that the electronic message composed by the sender is converted accurately into the sender's handwriting in the electronic format. Again, the sender's handwriting in the electronic format further defines a sender's electronic handwriting message.

Alternatively, in one of the preferred embodiments, the sender may also electronically scan the sender's actual handwriting that was once documented in the past. For example, in one of the preferred embodiments, the sender may scan the sender's handwriting from sender's high school years by scanning the document on which it was once written. The server 185 then identifies this writing, including all its incorporated individual characters in the electronic format, processing it to be stored electronically on the database 180 over the network 160. Given this, in one of the preferred embodiments, the software application 195 is configured to permit the sender to store each of the sender's handwriting in the electronic format, i.e., high school handwriting or present handwriting for example, on to the database 160 under an appropriate title in the sender's account. In other preferred embodiments, however, the sender may not be required to access the sender's electronic handwriting stored in the database 180. This is because the sender, as illustrated in FIG. 8 again, in real time, may instantly write on the interactive user interface 820 of the electronic device 840 using the interactive tool 810. Alternatively, the sender can scan the sender's handwriting from a medium such as a paper document to be electronically uploaded for conversion. As such, in this embodiment, the server 185 processes the sender's electronic handwriting message, without having it to store on the database 180. This means that the sender has direct access to the handwriting selection screen of the GUI 220 of the software application 195 to instantly convert the electronic message composed by the sender into the sender's electronic handwriting message. As this can be done in real time as one continuous process, in this preferred embodiment, the necessity to have the database 180 store the sender's handwriting over the network 160 can be entirely or partially avoided. Similarly, the need to have a network 160 can be entirely or partially avoided, if the server 185 including the processor 190 and the software application 195 are located locally on the electronic device 140.

Furthermore, referring again to FIG. 5, in one of the other preferred embodiments, the method to authenticate the electronic message composed by the sender to the recipient in the sender's handwriting includes encrypting the sender's electronic handwriting message to restrict readability of message contents 560. Accordingly, the sender may be notified by the software application 195 to encrypt the sender's electronic handwriting message before transmission. Alternatively, in other preferred embodiments, the software application 195 may be operable to automatically encrypt the sender's electronic handwriting message, before it is transmitted to the intended recipient(s). Furthermore, the GUI 220 of the software application 195 may also display a selection of encryption codes for the sender (not shown). This means that in some preferred embodiments, the sender may be given a choice to select from a plurality of codes depending on various factors, including but not limited to the intent of the message, the level of security preferred or the type of mail service. As such, the software application 195 is configured to encrypt the sender's electronic handwriting message. This may ensure that no third party, other than the intended recipient, is able to the message contents. Accordingly, in one of the preferred embodiments, the software application 195 is configured to generate the hash code (not shown). The hash code is preferably inserted along the bottom edge of the formatted sender's electronic handwriting message. More specifically, in one of the preferred embodiments, the software application 195 is configured to generate at least one hash code to be embedded in the sender's electronic handwriting message. As such, the hash code is invisible to the naked eye, avoiding any express display within the message or anywhere on the GUI of the software application. Additionally, the hash code may implicitly represent as a "stamp" of sorts that allows the sender's electronic handwriting message to serve as an encryption. Alternatively, in other embodiments, the hash code may be positioned at different locations within the formatted sender's electronic handwriting and may be visible to the naked eye. Given all this, in one of the preferred embodiments, at least one hash code is configured to provide at least one encryption algorithm. As such, the encryption algorithm may comprise, but is not limited to a proprietary score, a known code and a visual identifier. As such, each of the encryption algorithms have already been explained in greater detail.

Referring again to FIG. 5, in one of the preferred embodiments, the method to authenticate an electronic message composed by the sender to the recipient in the sender's handwriting further includes transmitting the sender's electronic handwriting message to the recipient 580. More specifically, the software application 195 is configured to prompt to the sender to transfer the sender's electronic handwriting message back to the user interface of the electronic mail service. As such, this is one of the preferred embodiments in which the sender's electronic handwriting message can be transmitted to its intended recipient(s) via electronic mail. Accordingly, the transfer of the sender's electronic handwriting message can be automated by activating an embedded widget (not shown) of the web mail service provider on one of the interfaces of the GUI 220 of the software application 195. This allows the software application 195 to directly transfer the sender's electronic handwriting message back into the sender's web mail service user interface 320. More specifically, the software application can be configured to communicate with the sender's web mail service. However, in order to accomplish this, the sender may be required to first log into the sender's user account on the web mail service to further this automatic transfer of the sender's electronic handwriting message into the user interface of the sender's account on the web mail service. Alternatively, in other preferred embodiments, once the sender's electronic handwriting message is ready to be transmitted, the sender may execute a "copy" function within the GUI 220 of the software application 195. This can be executed by electronically copying the sender's electronic handwriting message from one of the interfaces of the GUI 220 of the software application 195 and electronically pasting it into the user interface 320 of the sender's account on the web mail service. As such, in other preferred embodiments, the software application 195 may comprise of at least one embedded widget of a third party electronic mail service carrier embedded within the GUI 220 of the software application 195. Given this, the electronic mail service carrier can be HOTMAIL, GMAIL, WEBMAIL, OUTLOOK, AOL, MSN, and the like. So then, once the sender's electronic handwriting message is pasted on to the user interface 320 of the sender's web mail service, the sender inputs the intended recipient's email address within the user interface of the web mail service. Then, the transmission of the sender's electronic handwriting message is executed when the sender hits the "send" button within the user interface of the sender's account on the web mail service.

Conversely, as illustrated in FIG. 3A, an embedded widget 300 of the software application can also be embedded within the user interface(s) 320 of the third party electronic mail service carriers/providers. For example, the embedded widget 300 may be embedded and displayed on the user interface 320 of the web mail service such that when the sender activates the widget 300 embedded therein, the software application 195 initiates one of the interfaces of its GUI 220 prompting the sender to convert the composed electronic message of the sender into the sender's handwriting in the electronic format. As such, in this preferred embodiment, it may necessitate for the user to have already logged into the software application 195, allowing the software application 195 to remain operable. Accordingly, this enables the sender to activate the GUI 220 of the software application 195 to transfer the electronic message composed by the sender, and subsequently, converting it into sender's electronic handwriting message.

Figure 6:
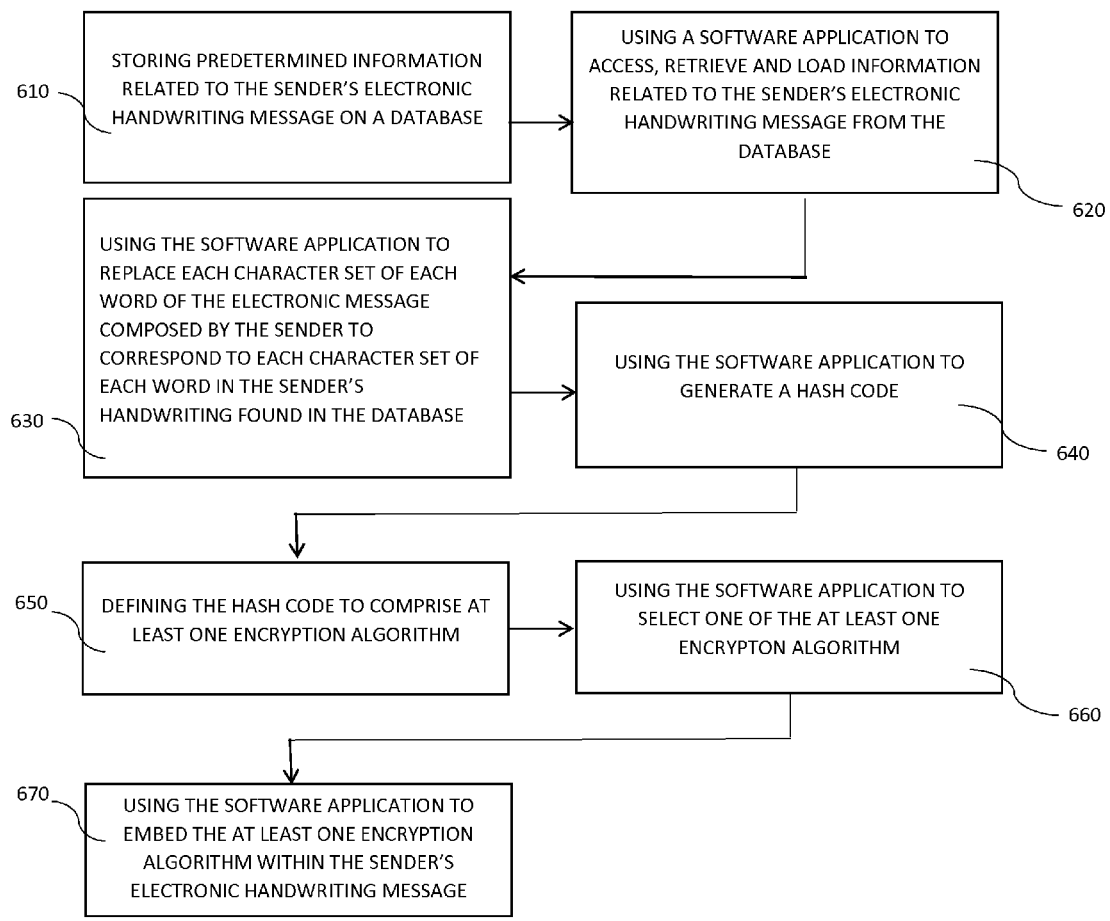
FIG. 6 is a flowchart directed to another method of the present invention in accordance to one of the preferred embodiments.

Furthermore, referring to FIG. 6, the method to authenticate an electronic message composed by the sender to the recipient in the sender's handwriting further includes storing information related to the sender's handwriting in the electronic format on a database 610. As such, the database 180 is configured to store predetermined amount of information related to the sender's handwriting in the electronic format. Given this, when the server 185 including the processor 190 and the software application 195 uploads at least one of the sender's handwriting in the electronic format, the server 185 communicates with the database 185, ensuring that the information related to the sender's handwriting in the electronic format is forwarded to be stored.

Next, referring to FIG. 6 again, the method to authenticate an electronic message composed by the sender to the recipient in the sender's handwriting further includes using the software application to access, retrieve and load information related to the sender's handwriting in the electronic format from the database 620. As such, whenever, the sender logs into the sender's account on the software application 195, the server 185 of the software application 195 is configured to access the sender's information. According the server 185 to retrieve the data stored on the database 180. The server 185 retrieves the sender's data from the database 180 and uploads it on to one of the interfaces of the GUI 220 of the software application 195. As such, the sender is able comprehensively view the stored sender's handwriting information in the electronic format related to the sender to subsequently select from.

Furthermore, referring to FIG. 6, the method to authenticate an electronic message composed by the sender to the recipient in the sender's handwriting further includes using the software application to replace each character set of each word of the electronic message composed by the sender to correspond to each character set of each word in the sender's electronic handwriting message found in the database 630. As such, the software application 195 is configured to convert each and every word of the electronic message composed by the sender into the sender's handwriting in the electronic format selected by the sender. As such the electronic format further defines the sender's electronic handwriting message. So for example, the sender may select the sender's handwriting from high school years from the selection interface of the GUI of the software application 195 as shown in FIG. 2B. As such, the software application 195 is configured to replace each and every character of each and every word of the electronically composed message of the sender to correspond to each and every character of each and every word of the sender's handwriting from high school years in the electronic format. This will be subsequently displayed on one of the interfaces of the GUI 220 of the software application 195 for the sender to view.

Next, referring to FIG. 6 again, the method to authenticate an electronic message composed by the sender to the recipient in the sender's handwriting further includes using the software application 195 to generate a hash code. More specifically, the software application 195 generates the hash code and preferably inserts it along the bottom edge of the formatted sender's electronic handwriting. Additionally, in one of the preferred embodiments, the software application 195 is configured to generate at least one hash code to be embedded in the sender's electronic handwriting message. Even further, in some preferred embodiment, the software application 195 is also configured to locate and identify the hash code embedded in the sender's electronic handwriting message. However, the hash code may not visible to the naked eye, and as such, will not be expressly displayed anywhere in the encrypted message or on any of the interfaces of the GUI 220 of the software application 195, despite its ubiquitous presence, once embedded. As such, the hash code may implicitly represent as a "stamp" of sorts that allows the sender's handwriting itself to serve as an encryption. Alternatively, in other embodiments, the hash code may be positioned at different locations within the formatted sender's electronic handwriting message. Additionally, in other preferred embodiments, the hash code may also be visible to the naked eye. So then given all this, once the hash code is generated and embedded, the software application 195 is configured to locate and identify the hash code embedded in the sender's electronic handwriting.

Referring to FIG. 6 again, in one of the preferred embodiments, the method to authenticate an electronic message composed by the sender to the recipient in the sender's handwriting further includes defining the hash code to comprise at least one encryption algorithm. As such, the encryption algorithm may comprise, but is not limited to a proprietary score, a known code and a visual identifier. Consequently, these have been described in greater detail. Furthermore, referring to FIG. 6 yet again, the method to authenticate an electronic message composed by the sender to the recipient in the sender's handwriting further includes using the software application 195 to select from one of the at least one encryption algorithm. Accordingly, one of the interfaces of the GUI 220 of the software application 195 displays a selection of encryption algorithms the sender can select from (not shown). Alternatively, in other preferred embodiments, the software application 195 may be configured to auto-select, wherein the software application 195 makes a determination as to what encryption algorithm or combination thereof may be applicable. Moreover, referring to FIG. 6, the method to authenticate an electronic message composed by the sender to the recipient in the sender's handwriting further includes using the software application 195 to embed the at least one encryption algorithm within the sender's electronic handwriting message. More specifically, and as explained earlier, the encryption algorithm is strategically embedded with the sender's electronic handwriting message. Again, the embedding of the encryption algorithm may depend on the type of encryption algorithm selected by the sender. As such, the software application 195 is configured to encrypt the sender's electronic message by embedding at least one encryption algorithm within the message.

Figure 7:
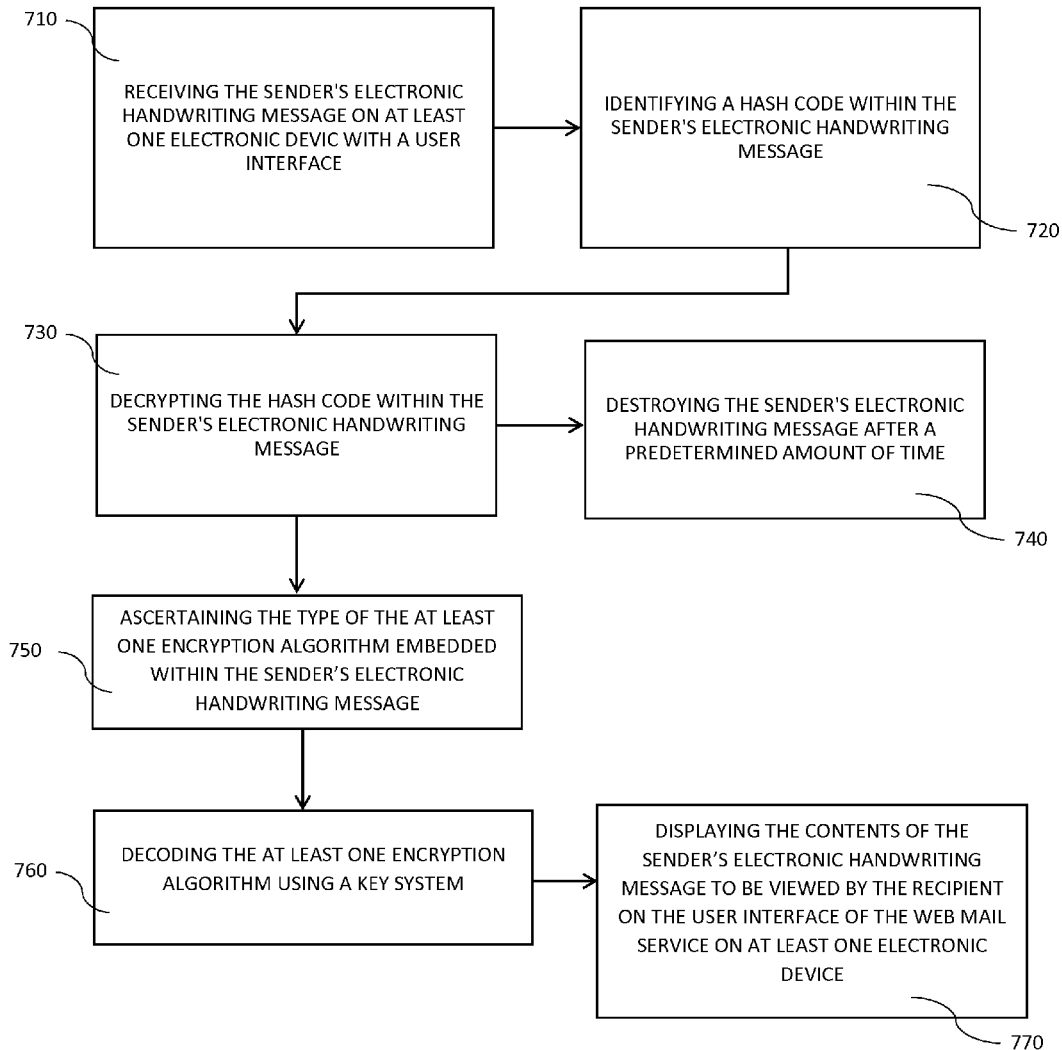
FIG. 7 is a flowchart directed to another method of the present invention in accordance to one of the preferred embodiments.

Referring now to FIG. 7, in one of the embodiments, the method to decipher a sender's electronic handwriting message delivered to a recipient includes receiving the sender's electronic handwriting message on at least one electronic device with a user interface 710. More specifically, the method to decipher the sender's electronic message delivered to a recipient includes displaying the contents of the sender's electronic handwriting message on one of the interfaces of the GUI 220 of the software application 195. Accordingly, once the converted and encrypted sender's electronic handwriting message is transmitted electronically, the recipient is able to receive and display the message preferably on the user interface 220 of the recipient's electronic mail account via the recipient's electronic mail service. Alternatively, in other preferred embodiments, the sender's electronic handwriting message can be sent and received on many other commercially viable electronic message platforms, services and devices including hand held devices, mobile phones, mini-computers, and the like. So then given all this, once the sender's electronic handwriting message has been received and identified, the recipient may initiate the decryption of the sender's electronic handwriting message by "clicking" on the software application 195 icon (not shown) located within the user interface 220 of the recipient's web mail service.

Alternately, as illustrated in FIG. 1, the recipient can also access the software application 195 on the server 185 by logging onto the recipient's account over the network 160.

Again, as disclosed, the server 185 may be remotely located and accessed via the network 160, or alternatively can be located locally. Consequently, the software application 195 as described in earlier embodiments, can also be accessed via the network 160 or alternatively, can be located on the electronic device. Given this, in one of the preferred embodiments, the recipient is directed to the GUI 220 of the software application 195, which comprises a log in interface as shown in FIG. 2A. In one of the preferred embodiments, the recipient logs into the recipient account on the software application 195. Accordingly, the recipient can then "copy" and "paste" the sender's electronic message onto the GUI 220 of the software application 195 in order to commence the decryption of the sender's electronic handwriting message. This is because, when initially received, the recipient (or anyone for that matter) is not able to access the contents of the sender's electronic handwriting message. Given this, the recipient utilizes the software application 195 to decrypt the encrypted sender's electronic handwriting message. Again, the encrypted sender's electronic handwriting message contains embedded hash code that only the software application 195 can identify and decrypt. This is because the encryption code including its location within the sender's electronic handwriting message cannot be identified by the naked eye.

Accordingly, referring to FIG. 7, in one of the preferred embodiments, the method to decipher a sender's electronic message delivered to a recipient includes identifying a hash code within the sender's electronic handwriting message 720. However, as aforementioned in earlier embodiments, none of the hash codes are visible to the naked eye, and as such, will not be expressly displayed, despite its ubiquitous presence. Additionally, the hash codes may be positioned at different locations within the formatted sender's electronic handwriting message. Given all this, in one of the preferred embodiments, the software application 195 identifies the hash code by scanning the sender's electronic handwriting message. Scanning through the entire message enables the software application 195 to provide a comprehensive search that may be necessary to locate all the embedded hash codes. As such, the software application 195 scans the sender's electronic handwriting message configuring the precise location of all of the embedded hash codes therein. This is because, in alternate preferred embodiments, it is possible that the sender may have embedded multiple hash codes within the sender's electronic handwriting message. Additionally, the hash codes may be located within various coordinates of the sender's electronic handwriting message. Consequently, the software application 195 searches the entire message, ensuring that all the hash codes are accurately located.

Referring back to FIG. 7, in one of the preferred embodiments, method to decipher a sender's electronic message delivered to a recipient comprises decrypting the hash code within the sender's electronic handwriting message 730. Accordingly, once the software application 195 searches, identifies and locates the hash code(s) embedded within the sender's electronic handwriting message, the software application 195 commences the decryption process. Accordingly, the decryption process depends on the type of hash code that the sender has used to encrypt the message. In other words, decrypting the hash code within the sender's electronic handwriting first comprises ascertaining the type of the encryption algorithm embedded within the sender's electronic handwriting 750 as seen in FIG. 7. As such, and again as illustrated in FIG. 7, decrypting the hash code within the sender's electronic handwriting also further comprises decoding the at least one encryption algorithm using a key system 760. More specifically, the hash code is configured to provide at least one encryption algorithm. As such, the encryption algorithm comprises, but is not limited to a proprietary score (A Code), a known code (B Code) and a visual identifier (C Code). Given all this, the software application determines the precise type of encryption algorithm (A Code, B Code or C Code) embedded within the sender's electronic handwriting message. As such, determining the type of encryption algorithm may enable the software application 195 to consequently ascertain the precise decryption method that the software application 195 may be required to utilize. Accordingly, in some embodiments, the decryption method used by the software application 195 may be relative to the type of algorithm embedded in the sender's electronic handwriting message. For example, if the software application 195 ascertains the encryption algorithm to be A code, appropriate decryption method may be initiated. So then, if the embedded algorithm is A code, which is typically the private key, typically used by the sender/user/composer of the electronic message to decrypt their own electronic message rather than distributed publicly for the recipient to decipher the message, the software application 195 will look for an identical handwriting of the sender stored in the database. This is because the A code is used to unlock or decrypt an existing encrypted sender's electronic handwriting message based on the score system. More particularly, in one of the preferred embodiments, the A code is generated by using the score system by creating a score using the user's unique handwriting. As the user enters his own handwriting electronically in the software application 195, the software application 195 analyzes the user's handwriting in the electronic format. Accordingly, if the entered user's handwriting in the electronic format matches the score for the user's electronic handwriting message based on the score system, the A code is decrypted. Therefore, in this preferred embodiment, the user uses the private key (user's own handwriting) to decrypt the user's electronic message.

Furthermore, because the A code can be replicated by the user at any remote location given the fact that the user has immediate access to the user's own handwriting, in one of the preferred embodiments, no network to connect the user to the server or database to retrieve the A code is required. More specifically, in one of the preferred embodiments, in which the software application 195 is locally located on the electronic device 140, the user may not be required to connect to the server 185 over the network 160 in order to retrieve any of the sender's electronic handwriting from the database 180. In other words, once the user has "downloaded" the attachment or user's own electronic handwriting message locally to the electronic device in its encrypted A Code format, there is no requirement to upload it again in order to decrypt it. This is because the user can simply use the user's handwriting in the electronic format to match the score allocated to the user's electronic handwriting message. Therefore, to decrypt without remote server 185 access on the network 160, the user may simply use the interactive tool (stylus pen) 810 or the user's own fingers on the interactive interface (touch screen) 820 of the electronic device (tablet) 840 as illustrated in FIG. 8. In other words, the touch screen interface 820 of the electronic device 840 allows the user to electronically write in the user's own handwriting. As such, the software application 195 on the electronic device 840 automatically recognizes the user's handwriting in the electronic format on the touch screen interface 820. As such, this can be accomplished when the software application 195 is already active/open (not shown) on the electronic device 840. Given this, the software application 195 will allow the user to either upload this electronically handwritten message on the touch screen 820 of the device 840 to determine if an exact match is accomplished. Alternatively, referring to FIG. 8 and FIG. 9, in another preferred embodiment, the software application 195 may have a separate electronic handwriting interface 910 on its GUI 920 that allows the user to handwrite electronically using the touch screen 820 of the device 840 to determine if an exact match is determined. Therefore, in one of the preferred embodiments, where the user's message is encrypted with an A code, the user's handwriting in the electronic format itself will be sufficient to ascertain whether or not the downloaded user's electronic handwriting message can be decrypted. Accordingly, if the score is identical, the electronic handwriting message will be instantly decrypted allowing the user to view its contents. Furthermore, in some other preferred embodiments, the A code can also be used as the public key, in which the recipient decrypts the sender's message rather than the private key embodiment aforementioned. And so, in this preferred embodiment, the recipient may be able to decipher the user/sender's message that has been encrypted using the A code. To accomplish this, the recipient would require a prior sender/user's handwriting in the electronic format stored on the recipient's database 180. Accordingly, when the recipient receives the new, encrypted sender's electronic handwriting message, the software application 195 will compare the sender's handwriting in the electronic format stored on the recipient's database 180 with the new sender's handwriting electronic message received by the recipient. As such, if the software application 195 determines that the two have an identical score based on the scoring system, the sender's electronic handwriting message will be decrypted.

Next, if the software application 195 ascertains the encryption algorithm to be B code, appropriate decryption method may be initiated. As such, in one of the other preferred embodiments, the B code serves as a public key certificate. This typically means that the B code is configured to assist the remote recipient in decrypting the sender's electronic handwriting message, once it is received by the recipient. Furthermore, the B code, although similar to the public key certificate, can be arbitrary as a number, a code, an image, or a formula. Accordingly, in one of the preferred embodiments, the B code is randomly generated by the software application 195. This code is consequently shared only with the recipient by the sender. As such, the recipient can only decrypt the sender's electronic handwriting message by entering the identical number, code, image, or formula provided by the sender to the recipient in efforts to match the encrypted certificate of the B code. Accordingly, in other preferred embodiments, multiple certificates including a combination of numbers, codes, formulas can be generated as a B Code. As such, the B Code can also be customized by the sender. For example, the B code can be manually assigned by the sender to encrypt the sender's electronic handwriting message by replicating an answer to commonly asked questions such as, "What city were you born?" As such, the GUI 220 of the software application 195 via one of its interfaces, can prompt the recipient with the question as part of decrypting the sender's electronic handwriting message (not shown). Consequently, in this preferred embodiment, the GUI 220 of the software application 195 may also provide an interface for the recipient to enter the B Code provided by the sender to answer the aforementioned question (also not shown).

Furthermore, if the software application 195 ascertains the encryption algorithm to be C code, appropriate decryption method may be initiated. The C code may function as a checksum or validator to ensure that the sender's electronic message is genuine and has not been decoded before. Additionally, the C code is able to diagonally "stamp" the sender's electronic handwriting message and may include, but is not limited to a date code, a watermark, or a combination thereof. Additionally, the C code allows the sender to enhance the authenticity of the sender's electronic message, when it is remotely decoded by the recipient. As such, the C code is generated as a unique checksum for each and every electronic message based on the number of letters, space, words, and characters there are in the sender's handwriting. So for instance, in one of the preferred embodiments, C code(s) can be strategically embedded between words and letters at certain X and Y coordinates on the two dimensional plane of the sender's electronic handwriting message. Given this, if the sender's electronic handwriting message is represented as a two-dimensional plane, and if the C code is placed on coordinates (1,2) and (4,1) of the two dimensional electronic handwriting message plane, the sum of these X and Y coordinates would be (A+B)=(5,3). Accordingly, the C code is preferably encrypted as the sum (5,3). As such, when the recipient receives the message and commences decryption, any other sum besides (5,3) at which the C code is encrypted at, can signify to the recipient that the message is not authentic. Alternatively, in this preferred embodiment, once the sender's electronic handwriting message is received and the recipient commences decryption, if the C code exacts to the sum (5,3) as illustrated in the example above, it can signify that the sender's electronic handwriting message is genuine, and therefore validated. So therefore, in one of the preferred embodiments, when the software application 195 on the recipient's end commences the decryption process, it is configured to recognize that the sum of the C code should be identical based on the sum encrypted by the C code of the software application on the sender's end. As such, the software application 195 is configured to recognize various such systems of mathematical operations. Therefore, in other preferred embodiments, the C code may be generated automatically by using different variations including but not limited to subtraction, multiplication, division, standard deviation, median, mean, and other complex mathematical integrals.

Accordingly, once the encryption algorithm(s) using the key system is decoded, the method to decipher a sender's electronic message delivered to a recipient includes displaying the contents of the sender's electronic message to be viewed by the recipient on the user interface of at least one electronic device 770. As such, the recipient is able to view the contents of the message soon after it has been successfully decoded by the software application 195.

Furthermore, referring back to FIG. 7, in one of the preferred embodiments, the method to decipher a sender's electronic message delivered to the recipient comprises destroying the sender's electronic handwriting after a predetermined amount of time 740. More specifically, once the software application 195 decrypts the sender's electronic handwriting message, so as to make it readable to the user/recipient, the composer/sender of the message can assign a self-destructing timer to the electronic handwriting message. Accordingly, once the sender's electronic handwriting message is decoded and displayed 760, 770, a specified time limit based on the sender's election assigned to the electronic handwriting message, determines when the electronic handwriting message will deleted. So for instance, the software application 195 can be configured to assign a time limit on the sender's electronic handwriting message, after which the electronic handwriting message will be electronically "shredded." This means that the sender's electronic handwriting message will destroyed such that it would be improbable for anyone to retrieve it again. Accordingly, in one of the preferred embodiments, the sender may assign a time limit, which would immediately take effect after the user/recipient has successfully decrypted the electronic handwriting message. As a result, the software application 195 may be configured to program/code the time limit within the sender's electronic handwriting message, thus enabling it to self-destruct after the specified time is used up.

Furthermore, in other preferred embodiments, the sender's electronic handwriting message may also self-destruct, if methods other than the decryption of the codes is utilized. More specifically, the sender's electronic handwriting message is configured to destruct, if induced by any other method, other than decrypting/decoding the encryption algorithm within the sender's electronic handwriting message using the key system. So for example, if anyone including the recipient uses any other methods including but not limited to capturing screen shots, saving on the electronic device, uploading it to a cloud based server, and/or copying and printing the sender's electronic message are utilized, the sender's electronic handwriting message will destruct or electronically shred itself perpetually, so as to render it impossible for anyone to retrieve it again.

Any of the above methods may be completed in sequential order in at least one preferred embodiment, though they may be completed in any other order in other preferred embodiments. In at least one of the preferred embodiments, the above methods may be exclusively performed, but in other preferred embodiments, one or more steps of the methods as described may be skipped.

Since many modifications, variations and changes in detail can be made to the described preferred embodiment of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. A system for transmitting and authenticating an electronic message to a recipient in a sender's handwriting comprising:
    a server including a processor and a software application configured to execute instructions including:
    identifying the electronic message composed by the sender,
    selecting, at the sender's request, one of the sender's handwriting from a plurality of stored handwritings associated with the sender,
    converting the electronic message composed by the sender into the selected sender's handwriting,
    encrypting the sender's electronic handwriting message to prohibit readability of contents,
    calculating a proprietary score based on the plurality of stored handwriting associated with the sender,
    saving the sender's electronic handwriting message,
    opening the saved sender's electronic handwriting message,
    decrypting the sender's electronic handwriting message to recover readability of the contents, upon a matching of the proprietary score based on an input sample provided by the sender,
    transmitting the electronic message to the recipient;
    a database configured to store information related to the sender's handwriting in an electronic format, said database is in a communicating relation with the server over a network;
    at least one electronic device connected to the network; and
    said at least one electronic device having a user interface for the sender and the recipient to communicate via electronic messaging.

2. A system for transmitting and authenticating an electronic message composed by a sender to a recipient in a sender's handwriting comprising:
    a server including a processor and a software application configured to execute instructions including:
    identifying the electronic message composed by the sender,
    selecting, at the sender's request, a sender's handwriting,
    converting the electronic message composed by the sender into the selected sender's handwriting,
    formatting the sender's electronic handwriting message to correspond to the formatting of the electronic message composed by the sender,
    encrypting the sender's electronic handwriting message to prohibit readability of contents,
    calculating a proprietary score based on at least one stored handwriting associated with the sender,
    saving the sender's electronic handwriting message,
    opening the saved sender's electronic handwriting message,
    decrypting the sender's electronic handwriting message to recover readability of contents, upon a matching of the proprietary score based on an input sample provided by the sender,
    transmitting the sender's electronic handwriting message to the recipient;
    a database configured to store information related to the sender's handwriting in the electronic format, said database is in a communicating relation with the server over a network;
    at least one electronic device connected to the network; and
    said at least one electronic device defining a user interface for the sender and the recipient to communicate via electronic messaging.

3. The system as recited in claim 2, wherein said server is configured to retrieve predetermined amount of the sender's handwriting information from said database.

4. The system as recited in claim 2, wherein said software application is configured to generate at least one hash code to be embedded in the sender's electronic handwriting.

5. The system as recited in claim 4, wherein said software application is configured to locate and identify said at least one hash code embedded in the sender's electronic handwriting.

6. The system as recited in claim 2, wherein said software application configured to provide at least one encryption algorithm in the encrypting step.

7. The system as recited in claim 6, wherein said at least one encryption algorithm comprises the calculation and matching of a proprietary score.

8. The system as recited in claim 6, wherein said at least one encryption algorithm comprises the use and checking of a known code.

9. The system as recited in claim 6, wherein said at least one encryption algorithm comprises the use and checking of a visual identifier.

10. The system as recited in claim 2, wherein said software application can be located on said at least one electronic device.

11. The system as recited in claim 2 further comprising an embedded widget, wherein said embedded widget is presented on a user interface of a web based email service and configured to initiate access of the sender's electronic handwriting to the recipient.

12. The system as recited in claim 2 wherein said software application is further configured to destroy the sender's electronic handwriting message after a predetermined amount of time.

13. A system for transmitting and authenticating an electronic message to a recipient in a sender's handwriting comprising:
- a server including a processor and a software application configured to execute instructions including:
  - identifying the electronic message composed by the sender,
  - selecting, at the sender's request, one of the sender's handwriting from a plurality of stored handwriting associated with the sender,
  - converting the electronic message composed by the sender into the selected sender's handwriting,
  - encrypting the sender's electronic handwriting message to prohibit readability of contents,
  - calculating a proprietary score based on the plurality of stored handwriting associated with the sender,
  - saving the sender's electronic handwriting message,
  - opening the saved sender's electronic handwriting message,
  - decrypting the sender's electronic handwriting message to recover readability of the contents, upon a matching of the proprietary score based on an input sample provided by the sender,
  - transmitting the electronic message to the recipient,
  - destroying the sender's electronic handwriting message after a predetermined amount of time;
- a database configured to store information related to the sender's handwriting in an electronic format, said database is in a communicating relation with the server over a network;
- at least one electronic device connected to the network; and
- said at least one electronic device having a user interface for the sender and the recipient to communicate via electronic messaging.

* * * * *